United States Patent
Honda et al.

(10) Patent No.: US 10,644,641 B2
(45) Date of Patent: May 5, 2020

(54) VEHICLE DRIVE DEVICE

(71) Applicant: TOYOTA JIDOSHA KABUSHIKI KAISHA, Toyota-shi, Aichi-ken (JP)

(72) Inventors: Takumu Honda, Toyota (JP); Shigeru Kimura, Toyota (JP); Hiroshi Inano, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 16/164,034

(22) Filed: Oct. 18, 2018

(65) Prior Publication Data

US 2019/0149082 A1 May 16, 2019

(30) Foreign Application Priority Data

Nov. 15, 2017 (JP) .................................. 2017-219968

(51) Int. Cl.
| | |
|---|---|
| *H02P 29/64* | (2016.01) |
| *G01C 9/02* | (2006.01) |
| *B60K 6/26* | (2007.10) |
| *G01K 1/14* | (2006.01) |
| *G01K 1/20* | (2006.01) |

(52) U.S. Cl.
CPC ................ *H02P 29/64* (2016.02); *G01C 9/02* (2013.01); *G01K 1/14* (2013.01); *G01K 1/20* (2013.01); *B60K 6/26* (2013.01); *B60Y 2200/91* (2013.01); *B60Y 2200/92* (2013.01); *B60Y 2400/60* (2013.01); *G01K 2205/00* (2013.01)

(58) Field of Classification Search
CPC .. H02P 29/64; G01C 9/02; B60K 6/26; B60Y 2200/91
See application file for complete search history.

(56) References Cited

U.S. PATENT DOCUMENTS

| | | | |
|---|---|---|---|
| 2002/0063004 A1* | 5/2002 | Nagasaka | ................ B62J 35/00 180/69.4 |
| 2009/0218963 A1* | 9/2009 | Shen | ....................... F04B 47/00 318/135 |

FOREIGN PATENT DOCUMENTS

| | | |
|---|---|---|
| JP | 2007-321927 A | 12/2007 |
| JP | 4940765 B2 | 5/2012 |
| JP | 2013-167296 A | 8/2013 |

* cited by examiner

*Primary Examiner* — Cortez M Cook

(74) *Attorney, Agent, or Firm* — Oliff PLC

(57) ABSTRACT

A vehicle drive device includes: a casing within which lubricating oil is received; a rotating electrical machine provided within the casing, and including a stator with a coil; a temperature sensor provided within the casing; and a control device that functions as: a coil temperature estimation device executing a first temperature estimation in which correlation with a detected temperature is relatively high, and a second temperature estimation in which the correlation is relatively low; a determination device determining whether or not positional relationship between the temperature sensor and oil level is in a permitted state that permits the first temperature estimation; and a limitation device limiting load factor of the rotating electrical machine based on a result of the first temperature estimation when being in the permitted state, and limiting the load factor based on a result of the second temperature estimation when not being in the permitted state.

11 Claims, 14 Drawing Sheets

[FIG.1]
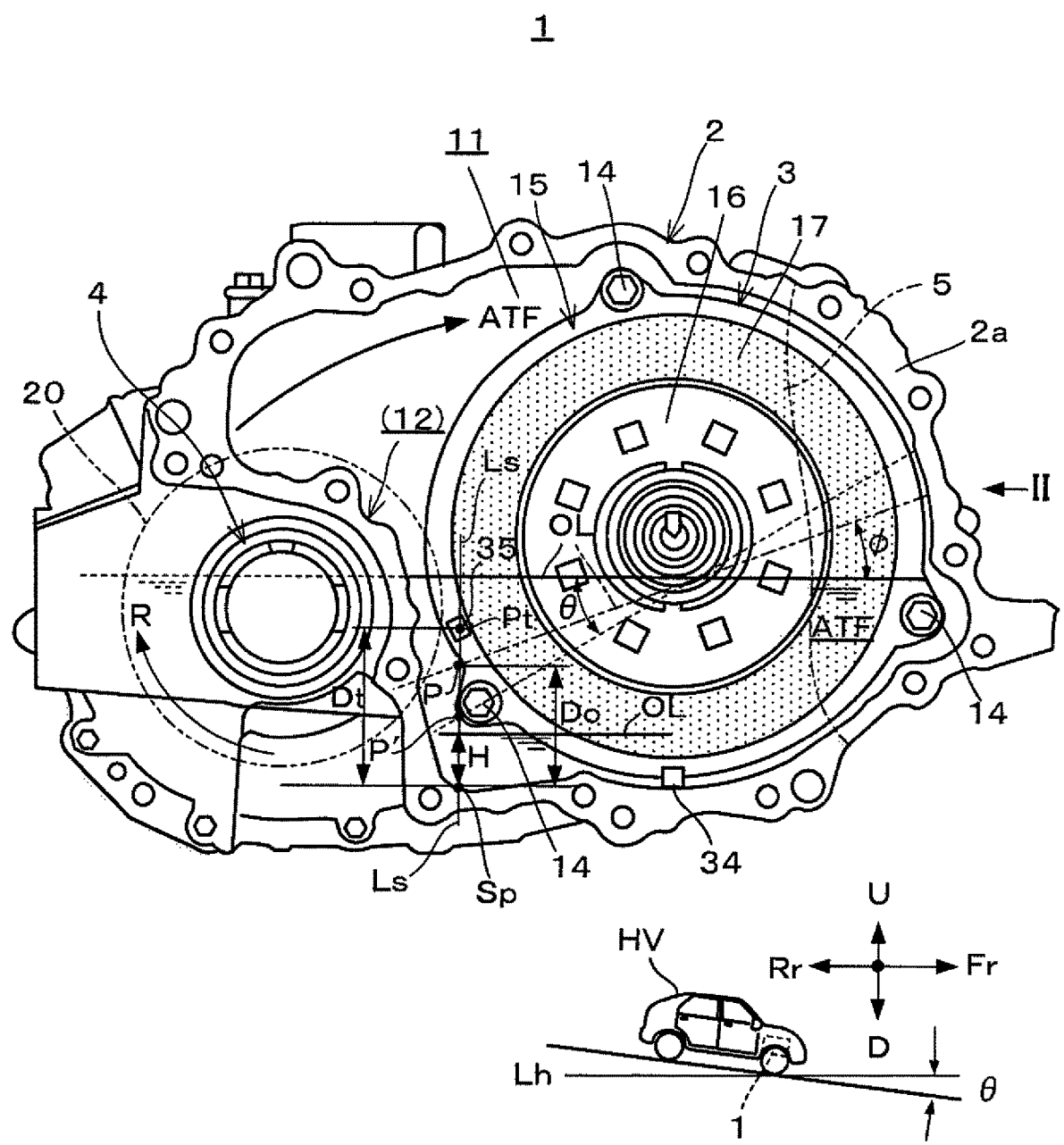

[FIG.2]
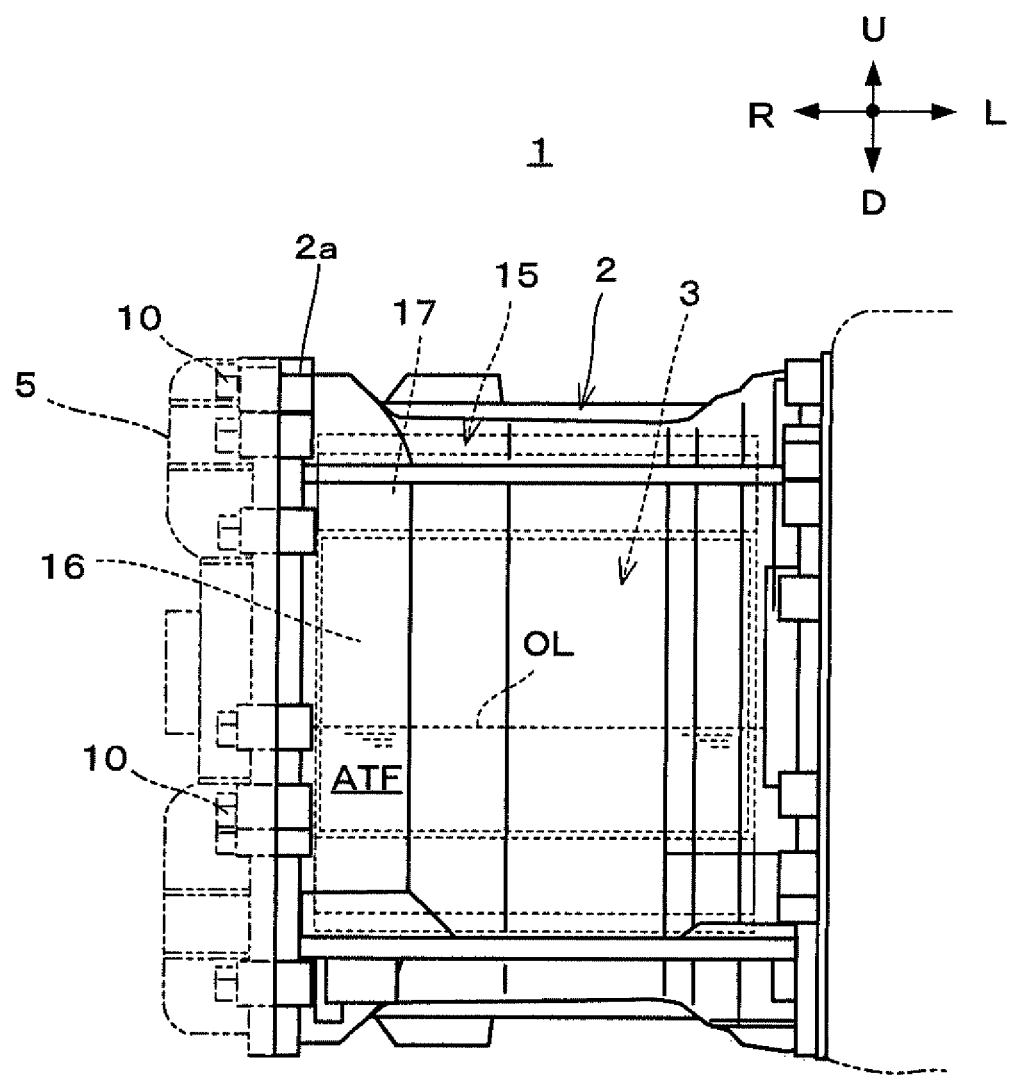

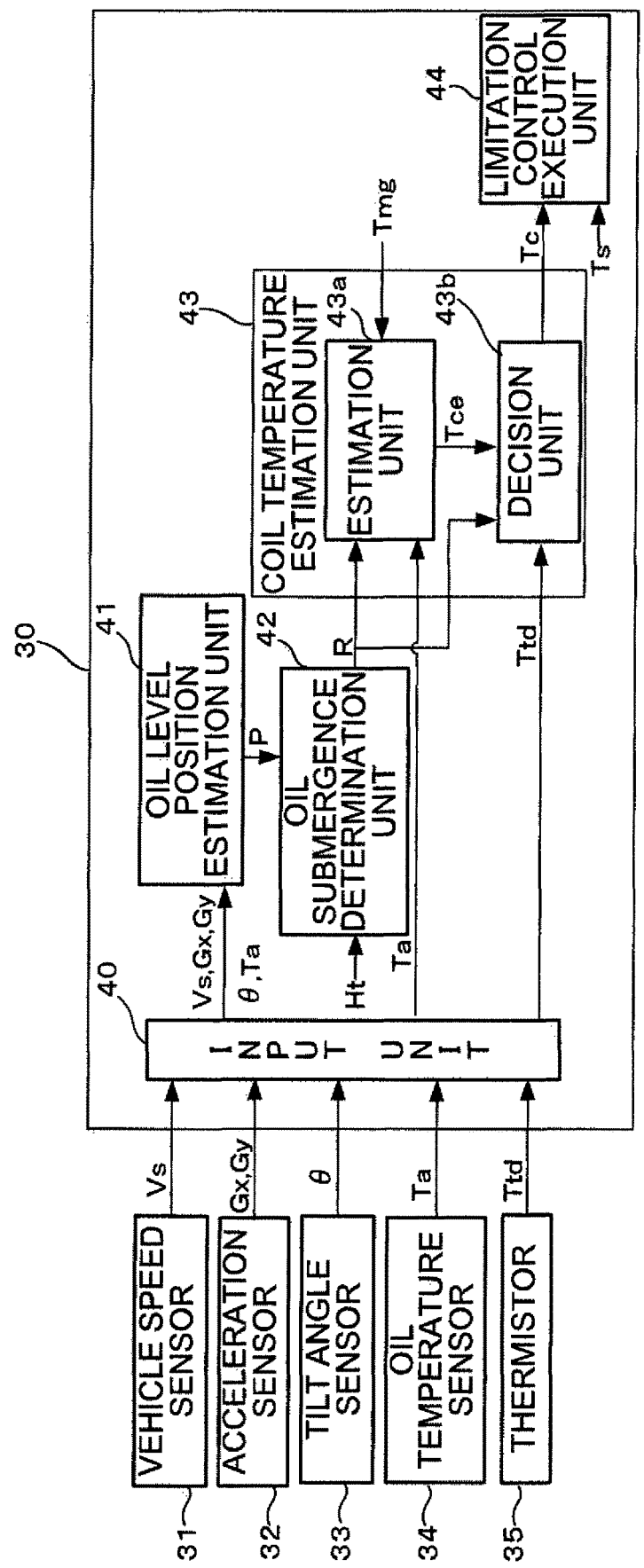
[FIG.3]

[FIG.4]
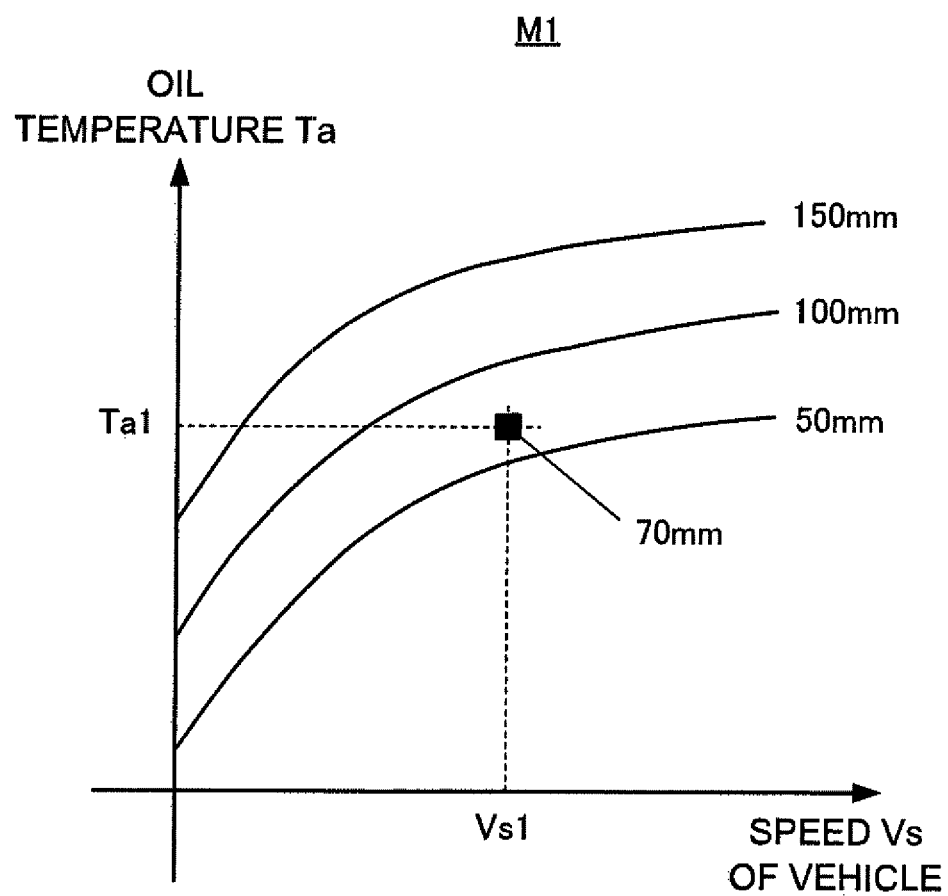

[FIG.5]
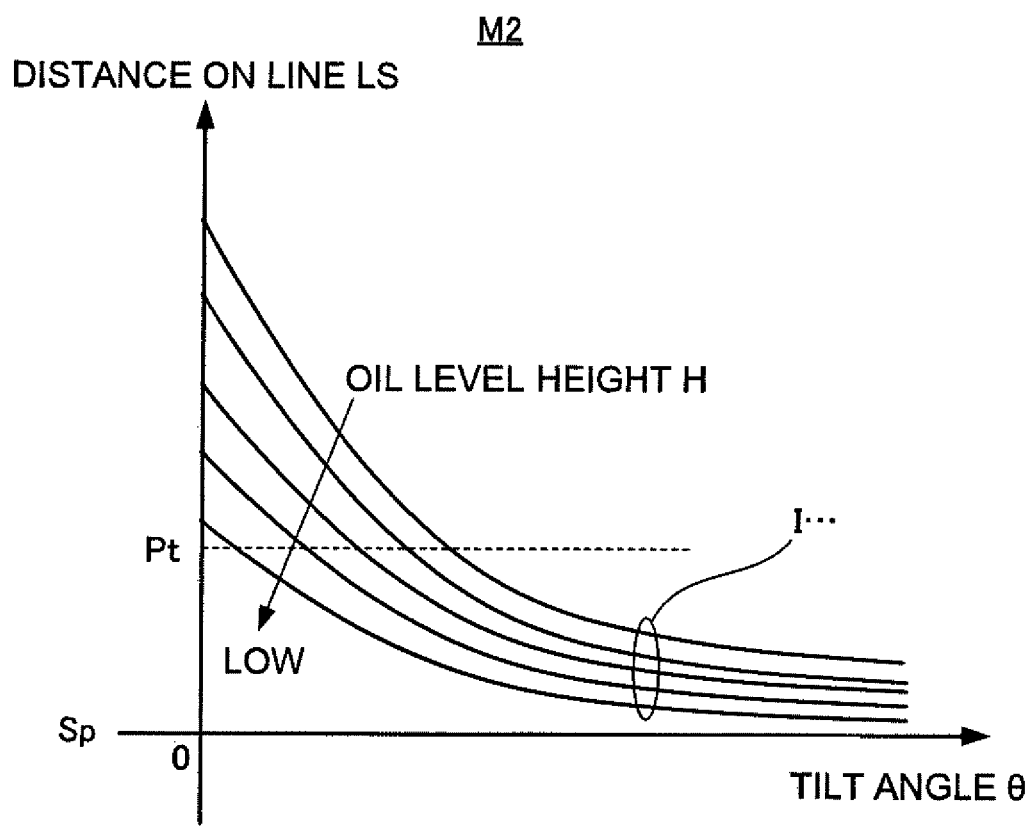

[FIG.6]
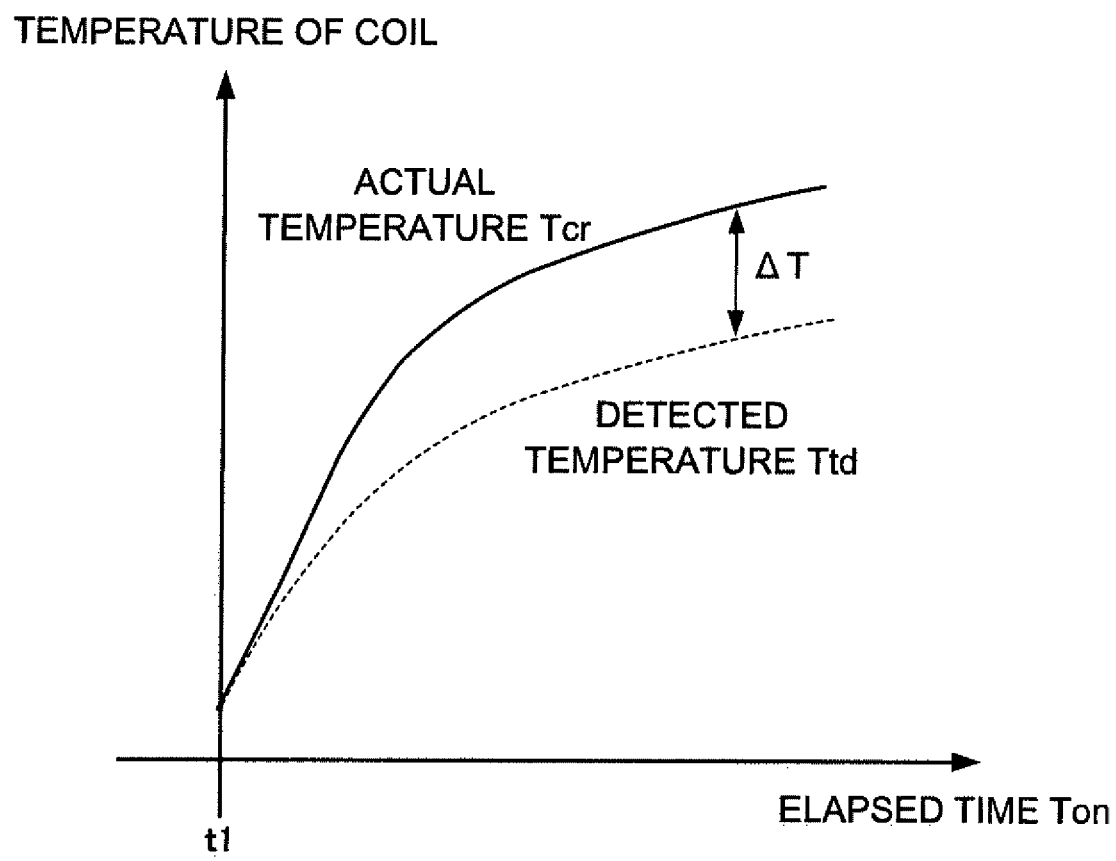

[FIG.7]
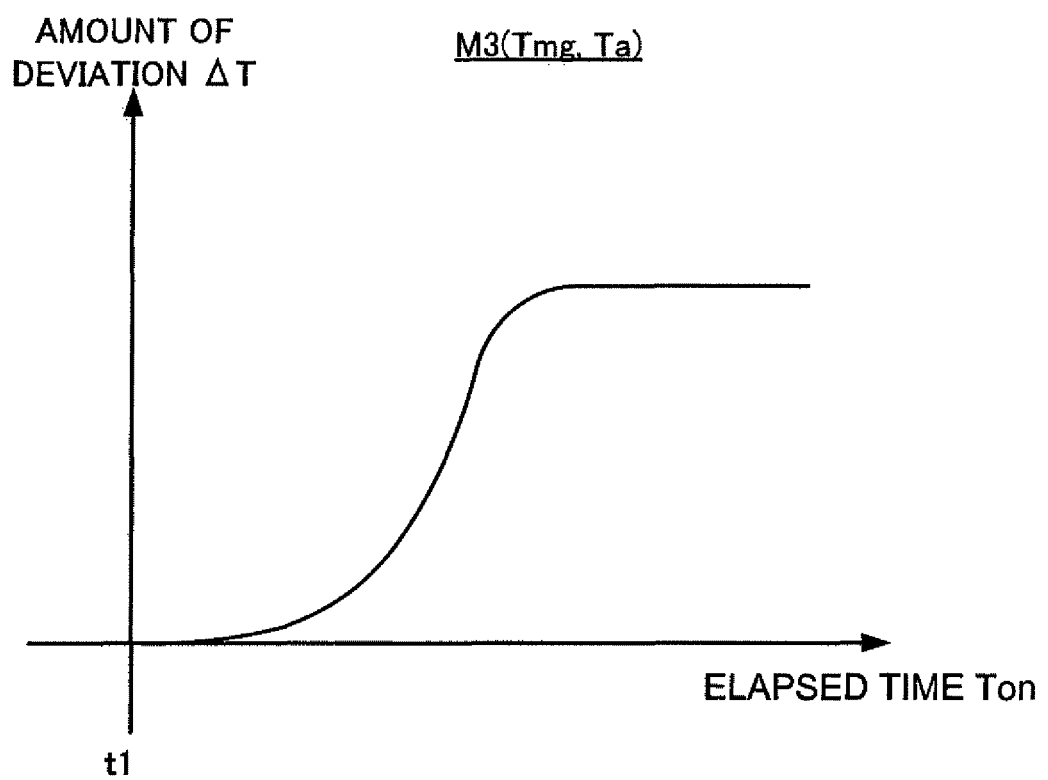

[FIG.8]
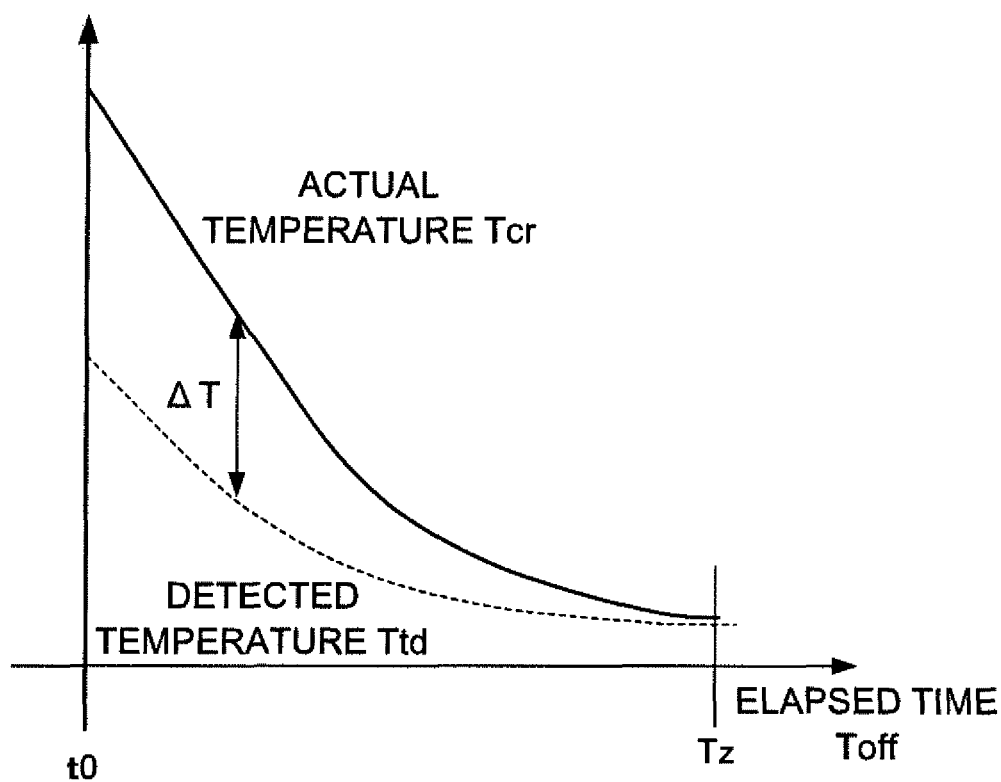

[FIG.9]
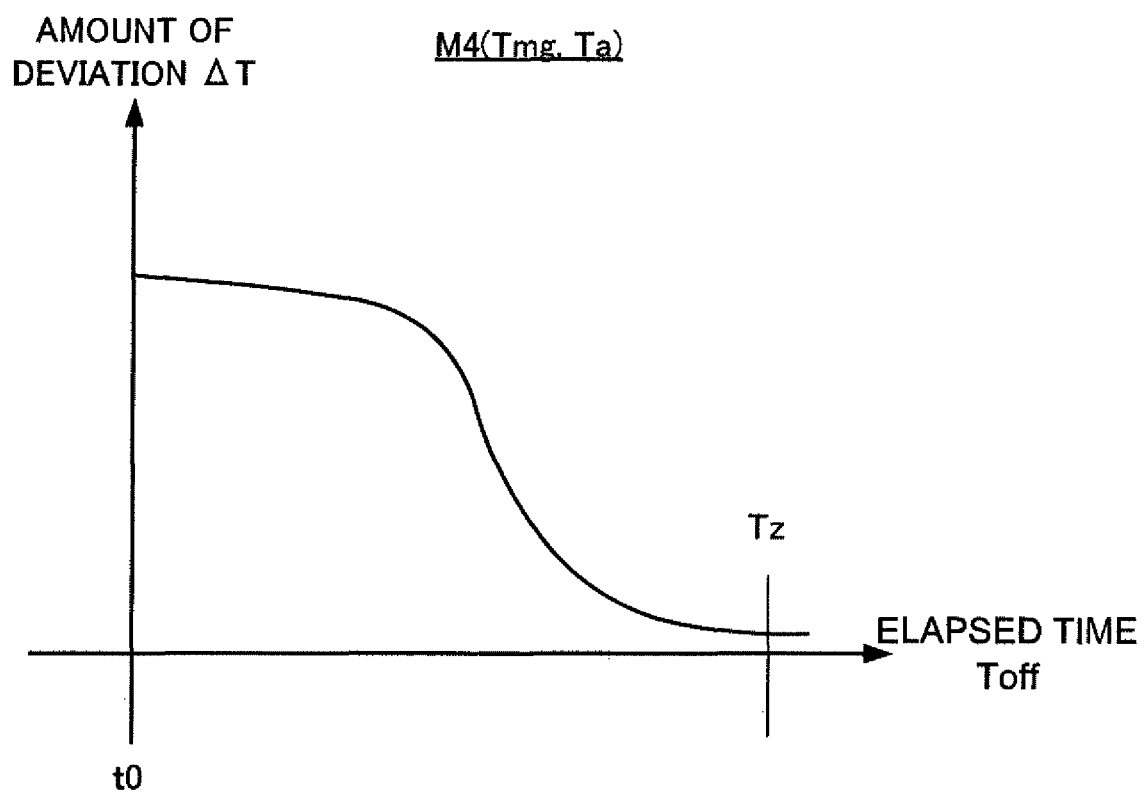

[FIG.10]
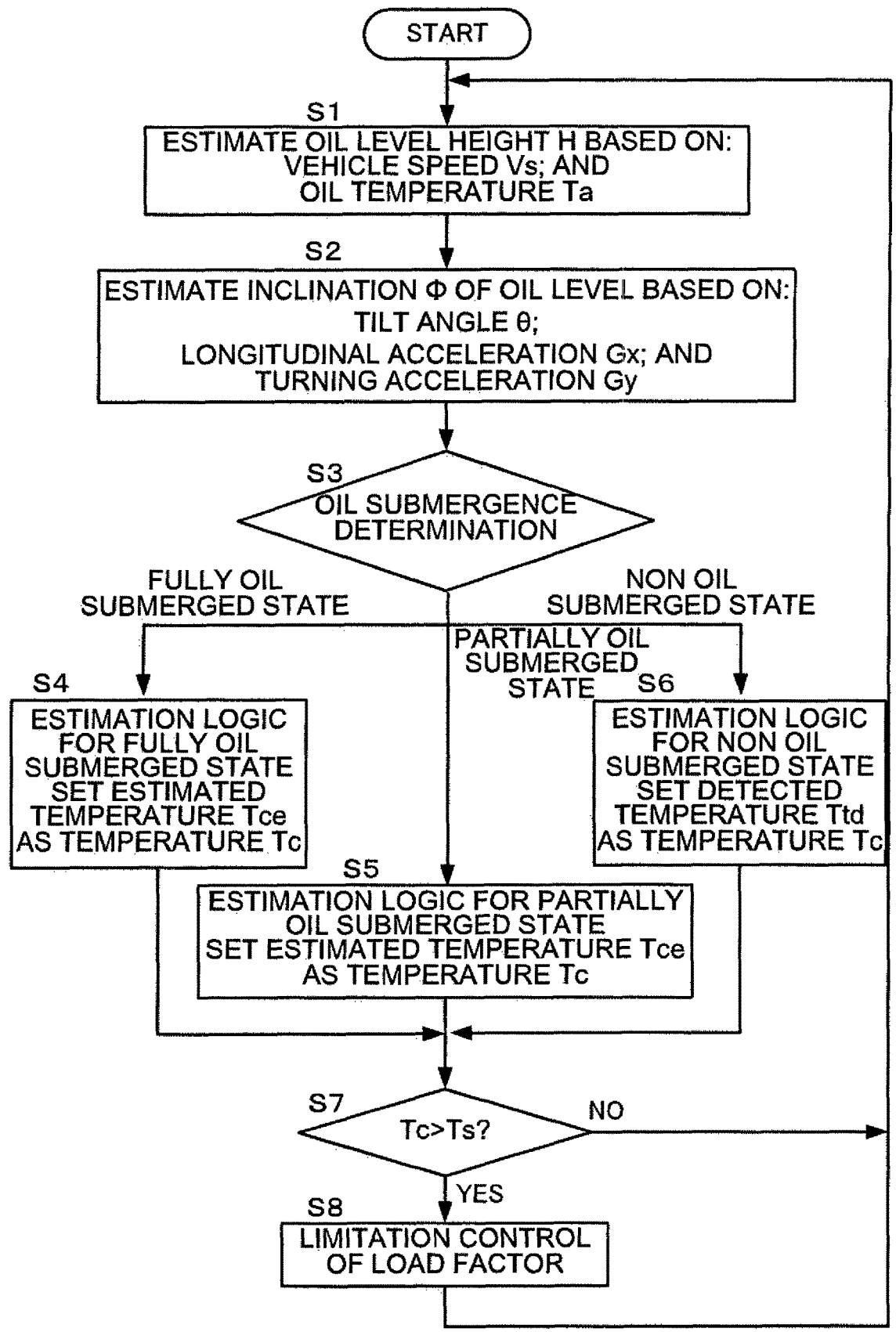

[FIG.11]
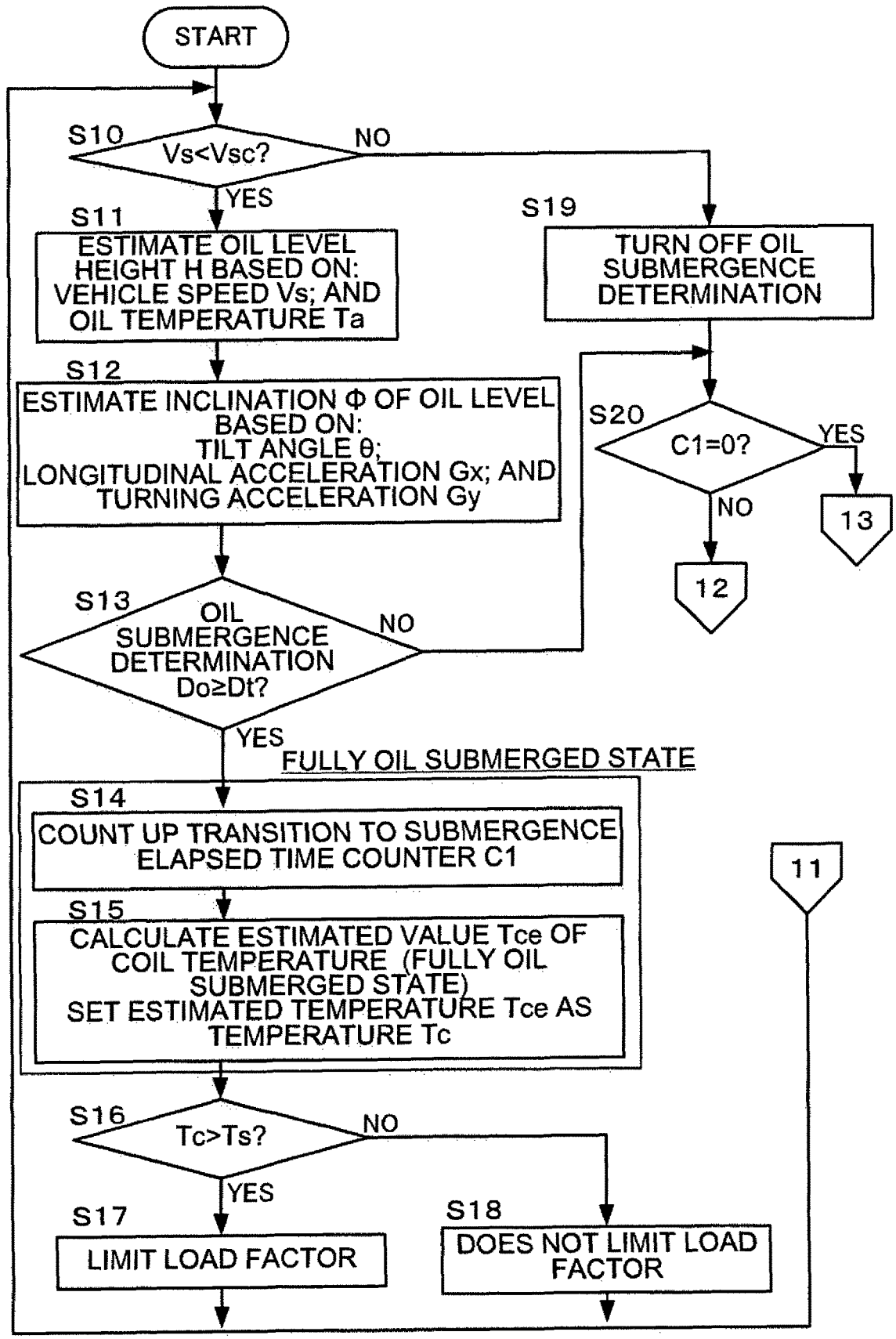

[FIG.12]
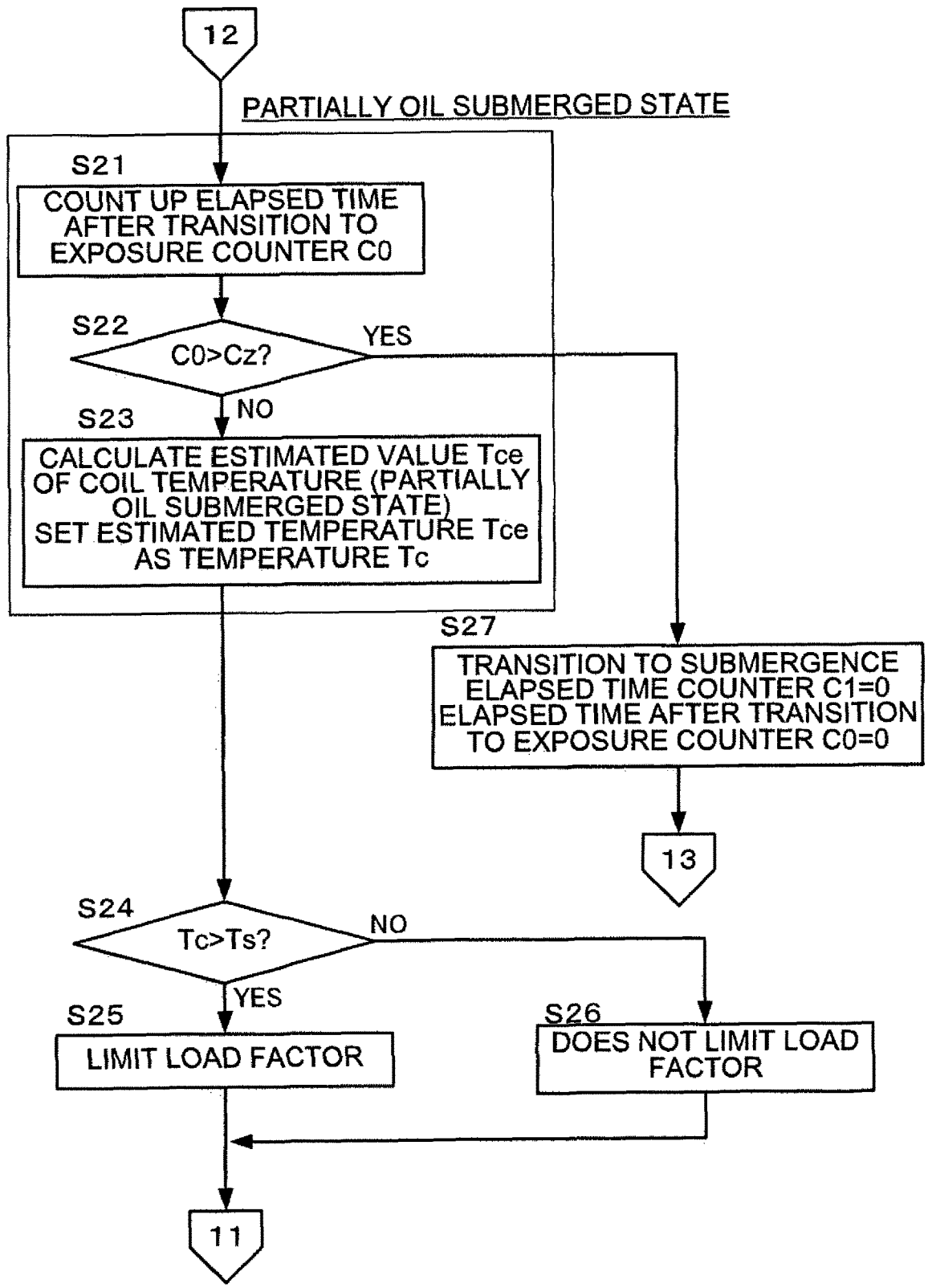

[FIG.13]
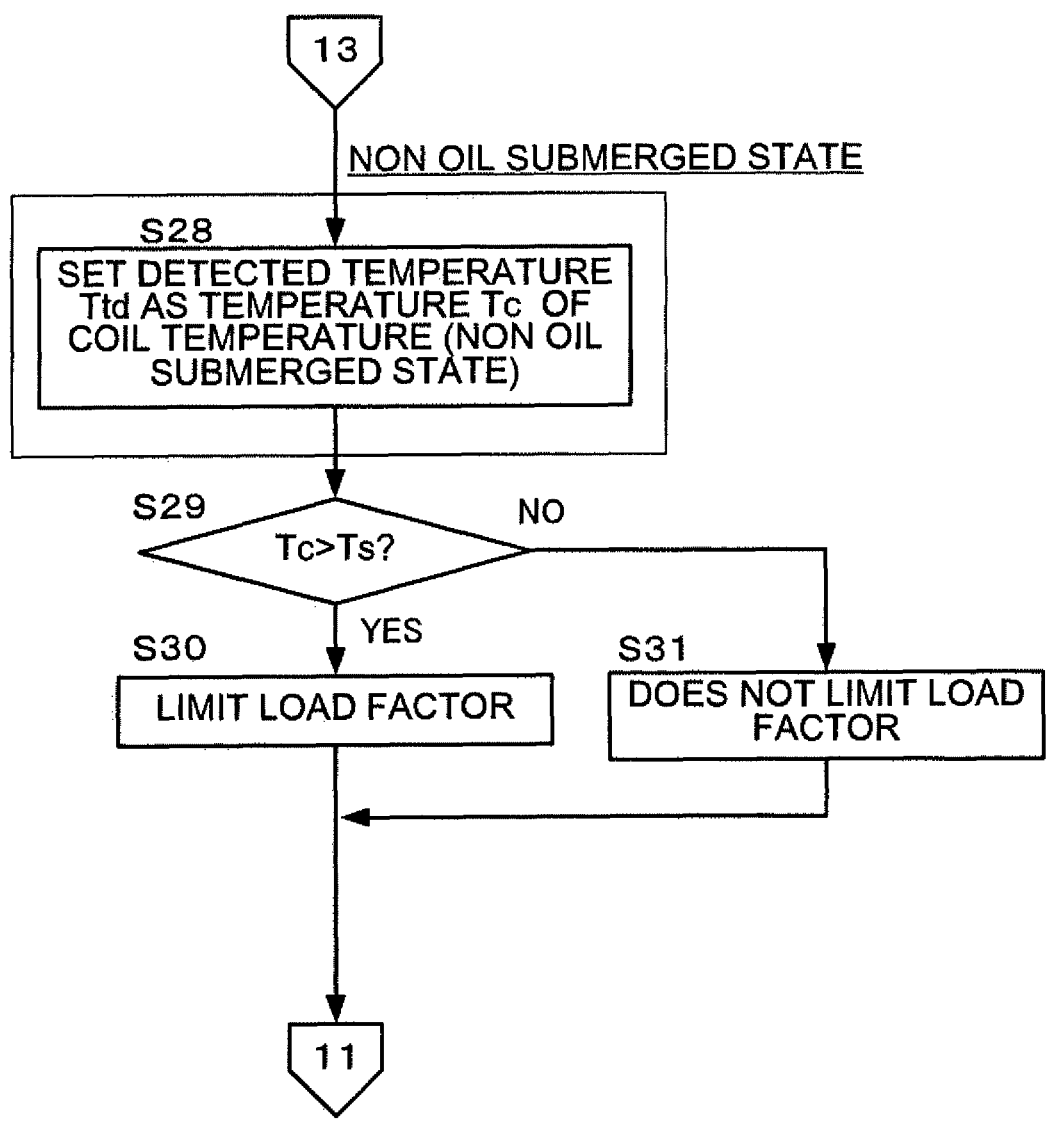

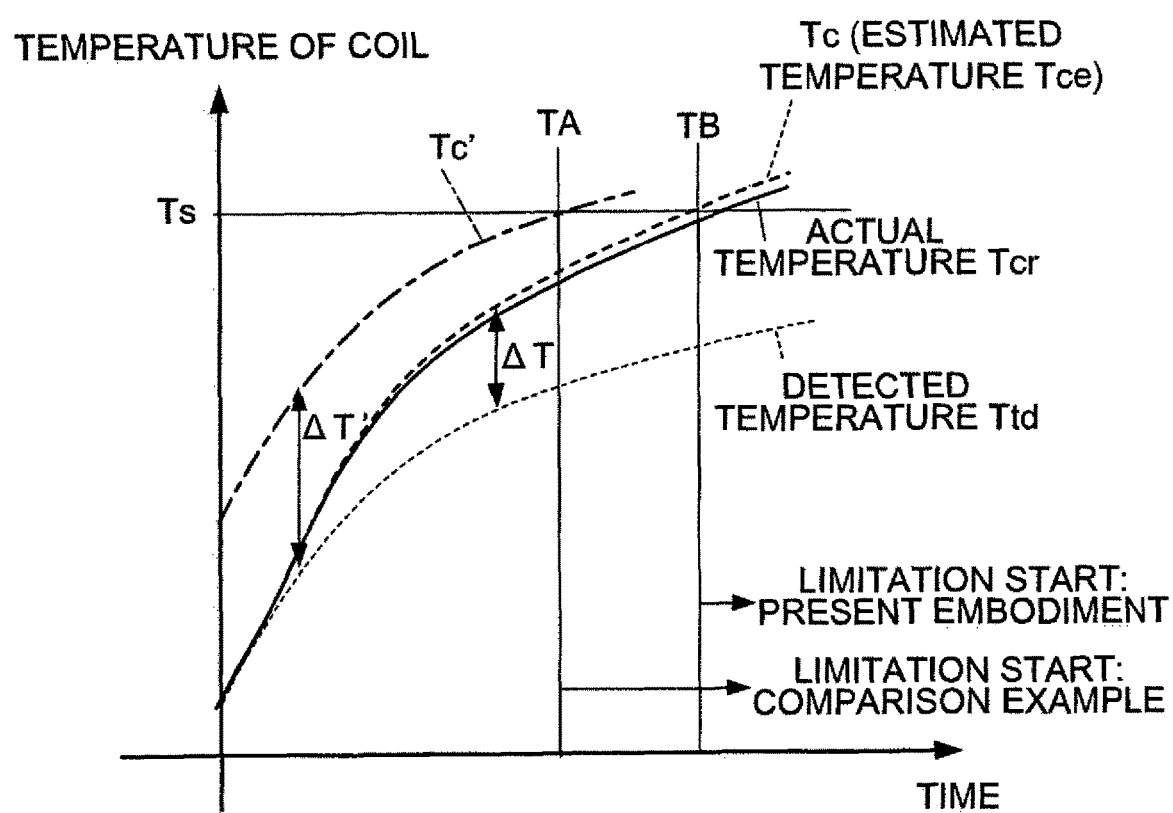
[FIG.14]

VEHICLE DRIVE DEVICE

BACKGROUND OF THE INVENTION

Field of the Invention

The present disclosure relates to a vehicle drive device that is mounted to a vehicle.

Background

A drive device for a vehicle is per se known (refer to Patent Document #1) that is provided with a casing containing a rotating electrical machine and a differential gear, and is configured to drag up lubricating oil in the casing due to the rotation of the differential gear. Furthermore, another drive device for a vehicle is per se known (refer to Patent Document #2) in which an electrically operated oil pump is controlled on the basis of information such as the gradient of the road surface upon which the vehicle is traveling and so on, so that oil level of lubricating oil received within a casing is kept at an appropriate position.

CITATION LIST

Patent Literature

Patent Document #1: Japanese Laid-Open Patent Publication No. 2013-167296.
Patent Document #2: Japanese Laid-Open Patent Publication No. 2007-321927.

SUMMARY

In order to prevent overheating of a rotating electrical machine, it has been proposed to provide a temperature sensor within the casing that detects the temperature of a coil thereof, and to implement limitation control by limiting the load factor of the rotating electrical machine according to the temperature detected by this temperature sensor. However, depending upon the running state of the vehicle, it sometimes happens that the position of the oil level changes so that the temperature sensor becomes submerged in the lubricating oil. When the temperature sensor thus becomes submerged, the temperature detected by the temperature sensor and the actual temperature of the coil diverge from one another. Accordingly, it may not be possible to implement the limitation control in an appropriate manner when estimating the temperature of the coil by a temperature estimation in which the correlation of the temperature of the coil with the temperature detected by the temperature sensor is considered to be relatively high, such as by regarding the temperature detected by the temperature sensor as being the temperature of the coil or the like. For example, if the limitation control is performed with the anticipation that a detected temperature that is lower than the actual temperature of the coil will be outputted when the temperature sensor is submerged in the oil, then the load factor may be limited, irrespective of whether or not the actual temperature of the coil has reached its standard heat resistant temperature.

Accordingly, the object of the present disclosure is to provide a drive device for a vehicle that is capable of appropriately implementing the limitation control of the load factor of a rotating electrical machine.

A vehicle drive device according to one aspect of the present invention comprises: a casing within which lubricating oil is received; a rotating electrical machine provided within the casing, and including a stator with a coil; a rotating member capable of being driven by power of a vehicle, and provided within the casing so as to drag the lubricating oil up toward the coil; a temperature sensor provided within the casing; and a control device that functions as: a coil temperature estimation device capable of executing a first temperature estimation in which correlation with a detected temperature detected by the temperature sensor is relatively high, and a second temperature estimation in which the correlation is relatively low; a determination device determining whether or not positional relationship between the temperature sensor and oil level of the lubricating oil is in a permitted state that permits the first temperature estimation; and a limitation device that limits a load factor of the rotating electrical machine based on a result of the first temperature estimation when determined that the positional relationship is in the permitted state, and that limits the load factor of the rotating electrical machine based on a result of the second temperature estimation when determined that the positional relationship is not in the permitted state.

BRIEF DESCRIPTION OF THE DRAWINGS

FIG. 1 is a figure showing principal portions of a vehicle drive device according to an embodiment of the present disclosure;

FIG. 2 is a figure showing a state seen in the direction shown by the arrow II in FIG. 1;

FIG. 3 is a block diagram showing an example of a control system for the vehicle drive device;

FIG. 4 is a figure showing an example of a calculation map for calculating oil level height at a tilt angle of 0°;

FIG. 5 is a figure showing an example of a map for calculating oil level height;

FIG. 6 is a figure showing the tendency of the amount of deviation between the actual temperature of a coil and its detected temperature to change according to elapsed time after a transition to submergence;

FIG. 7 is a figure showing an example of a calculation map for calculating this amount of deviation according to elapsed time after such a transition to submergence;

FIG. 8 is a figure showing the tendency of the amount of deviation between the actual temperature of the coil and its detected temperature to change according to elapsed time after a transition to exposure;

FIG. 9 is a figure showing an example of a calculation map for calculating this amount of deviation according to elapsed time after a transition to exposure;

FIG. 10 is a flow chart showing an example of a control routine;

FIG. 11 is a flow chart showing a first part of another example of a control routine;

FIG. 12 is a flow chart continuing on from FIG. 11;

FIG. 13 is a flow chart continuing on from FIGS. 11 and 12; and

FIG. 14 is a figure for explanation of the beneficial effects of an embodiment of the present disclosure, along with a comparison example.

DESCRIPTION OF THE EMBODIMENTS

As shown in FIGS. 1 and 2, a vehicle drive device 1 is configured as a hybrid transaxle that is mounted to a hybrid vehicle HV (hereinafter simply termed a "vehicle"). Furthermore, in FIGS. 1 and 2, the arrow sign Fr indicates the forward direction relative to the vehicle, the arrow sign Rr indicates the rearward direction relative to the vehicle, the arrow sign R indicates the rightward direction relative to the vehicle, the arrow sign L indicates the leftward direction relative to the vehicle, the arrow sign U indicates the upward direction relative to the vehicle, and the arrow sign D indicates the downward direction relative to the vehicle.

The vehicle drive device 1 includes a casing 2 that houses various structural components. For example, a source of drive power such as a motor-generator 3 and power transmission elements such as a differential mechanism 4 and so on are housed within the casing 2. An opening in the casing 2 is closed with a cover 5, and this cover 5 is fastened by a plurality of bolts 10 (refer to FIG. 2) in an abutting state to a flange 2a that is formed around the opening. Automatic transmission fluid ATF for lubrication and cooling is received within the casing 2. Instead of ATF, it would also be possible to employ transaxle fluid specifically developed for hybrid transaxle use.

A motor chamber 11 that houses the motor-generator 3 and a gear chamber 12 that houses the differential mechanism 4 are formed within the casing 2. The motor chamber 11 and the gear chamber 12 are mutually communicated in the upper portion of the casing 2, and also are mutually communicated via a communication passage (not shown in the figures) in the lower portion of the casing.

The motor-generator 3 provided in the casing 2 includes a stator 15 that is fixed to the casing 2 by three bolts 14, and a rotor 16 that is disposed in an inner periphery in the stator 15. The rotor 16 is supported by bearings not shown in the figures, and can rotate freely with respect to the casing 2. The stator 15 includes a coil 17, and electrical power is supplied to this coil 17 via an electrical circuit and a power supply line, neither of which is shown in the figures.

The differential mechanism 4 that is provided in the casing 2 includes a ring gear 20. This ring gear 20 is installed within the casing 2 so that a portion thereof is immersed in the ATF, and is supported in the casing 2 so as to be capable of rotating freely. When the vehicle HV is travelling, the ring gear 20 is rotating in the direction shown by the arrow sign R. Accordingly, some of the ATF that is held in the lower portion of the casing 2 is dragged up by the ring gear 20. A portion of the ATF thus dragged up by the ring gear 20 is led from the gear chamber 12 to the motor chamber 11, as shown by the arrow sign. Some of this ATF thus led to the motor chamber 11 splashes onto the stator 15 of the motor-generator 3, and serves to remove heat from the coil 17, thereby cooling the coil 17. And some of the remainder of the ATF that has been dragged up adheres to the inner walls of the casing 2, while also some splashes onto other structural elements provided within the casing 2 to cool them. The ATF that has thus been dragged up by the ring gear 20 and has been employed for cooling the motor-generator 3 and the other structural elements and the ATF that has adhered to the inner walls of the casing 2 fall downward due to gravity or trickle down along the inner walls of the casing 2, and return to the lower portion of the casing 2.

The amount of ATF per unit time that is dragged up by the ring gear 20 is large as compared to the amount of ATF per unit time that returns to the lower portion of the casing 2. Therefore, the height OL of the oil level of the ATF accumulated in the lower portion of the casing 2 is lower when the vehicle is traveling than when it is not traveling. In other words, the amount of ATF retained in the lower portion of the casing 2 is smaller when the vehicle is traveling than when it is not traveling. The amount of ATF per unit time dragged up by the ring gear 20 is proportional to the rotational speed of the ring gear 20 (i.e. the vehicle speed of the vehicle HV). Due to this, the oil level OL becomes lower, the higher is the vehicle speed. Moreover, the amount of ATF per unit time returning to the lower portion of the casing 2 becomes less, the longer is the time period over which the ATF adheres to the inner walls of the casing 2 or to the structural elements provided within the casing 2. This adhesion time period is correlated with the viscosity of the ATF. And the lower the temperature is, the higher the viscosity of the ATF becomes. Accordingly, the lower the temperature of the ATF is, the lower the oil level OL becomes.

When the vehicle HV is traveling along a horizontal road surface, the oil level OL of the ATF accumulated in the lower portion of the casing 2 is horizontal as shown by the solid line in FIG. 1, but, when the vehicle HV is traveling along a road surface that has a gradient, such as an uphill road or a downhill road, then the casing 2 becomes inclined along with the vehicle HV. Due to this, as shown by the two-dot chain line in FIG. 1, the position of the oil level OL with respect to the casing 2 becomes inclined by a tilt angle θ with respect to the position of the oil level OL when traveling upon a horizontal road surface. This tilt angle θ is defined as being the inclination of the vehicle HV with respect to the horizontal line Lh.

Furthermore, the relative position of the oil level OL with respect to the casing 2 varies according to inertial forces by acceleration of the vehicle HV, i.e. the longitudinal acceleration and the turning acceleration. The oil level OL tilts in the clockwise direction with respect to the casing 2 if the longitudinal acceleration is positive, and tilts in the anti-clockwise direction with respect to the casing 2 if the longitudinal acceleration is negative. Moreover, the turning acceleration of clockwise rotation causes the position of the oil level OL to tilt so as to become higher on the left side of the vehicle and to become lower on the right side of the vehicle (refer to FIG. 2).

From the above, when the vehicle HV is horizontally oriented (θ=0°), it is possible to specify the amount of ATF retained in the casing 2 (i.e. the height of the oil level) according to the speed of the vehicle HV, and moreover it is possible to specify the inclination of the oil level OL with respect to the casing 2 according to the tilt angle θ of the vehicle HV, its longitudinal acceleration, and its turning acceleration. Therefore, it is possible to specify the position of the ATF oil level OL with respect to the casing 2 on the basis of the retention amount of ATF and the inclination of the oil level OL.

Now, with this motor-generator 3 which is provided in the casing 2, the load factor is limited in order to prevent overheating in which the temperature of the coil 17 exceeds its heat resistance temperature. This limitation control for limiting the load factor is performed by an electronic control device 30 (refer to FIG. 3) that is installed in the vehicle HV and configured as a computer which implements control of the various sections.

A control system for this vehicle drive device 1 will now be explained with reference to FIG. 3. Required information is inputted to the electronic control unit (ECU) 30 from sensors of various types that are mounted to the vehicle HV for implementing limitation control of the load factor of the motor-generator 3. As shown in FIG. 3, these various sensors provided to the vehicle HV include a vehicle speed sensor 31 that outputs a signal corresponding to the vehicle speed Vs of the vehicle HV, an acceleration sensor 32 that outputs signals corresponding to the longitudinal acceleration Gx and the turning acceleration Gy of the vehicle HV, a tilt angle sensor 33 that outputs a signal corresponding to the tilt angle θ of the vehicle HV, an oil temperature sensor 34 provided at the bottom portion of the casing 2 (refer to FIG. 1) and outputs a signal corresponding to the oil temperature Ta of the ATF retained in the lower portion of the casing 2, and a thermistor 35 that is provided upon the external periphery of the coil 17 of the motor-generator 3 and moreover at a position that is lower than the height of the center of the coil (likewise refer to FIG. 1), and that outputs a detected temperature Td corresponding to the temperature of the coil 17.

The ECU 30 executes a predetermined program, and, due the operation thereof, logically includes the various functional units shown in FIG. 3. Information from the various sensors described above is inputted to an input unit 40. The vehicle speed Vs of the vehicle HV, the oil temperature Ta of the ATF, and the tilt angle θ of the vehicle HV, its longitudinal acceleration Gx, and its turning acceleration Gy, which are inputted to the input unit 40, are sent to an oil level position estimation unit 41. Moreover, the oil temperature Ta of the ATF is also sent to a coil temperature estimation unit 43.

First, on the basis of the vehicle speed Vs and the oil temperature Ta, the oil level position estimation unit 41 estimates the oil level height H under the hypothesis that the tilt angle θ is zero (θ=0°). As shown in FIG. 1, this oil level height H is defined as being the distance from a reference point Sp that is set at a predetermined position at the bottom portion of the casing 2 to the oil level OL on the straight line Ls between the reference point Sp and the thermistor 35. Since the oil level height H is uniquely obtained from the retention amount of ATF retained in the casing 2, accordingly the oil level height H is representative of the retention amount of ATF.

Estimation of the oil level height H may, for example, be implemented by referring to the map M1 shown in FIG. 4. As described above, the higher the vehicle speed Vs is, the lower the height of the oil level OL becomes, and the lower the ATF oil temperature Ta is, the lower the height of the oil level OL becomes. In consideration of the above characteristics, the map M1 is prepared in advance on the basis of, for example, the results of actual machine testing or simulation or the like, and is stored in a predetermined storage device of the ECU 30. The map M1 is defined as a function of the oil level height H when θ=0° with the vehicle speed Vs and the oil temperature Ta as variables. When, as shown for example in FIG. 4, the vehicle speed Vs is Vs1 and the oil temperature Ta is Ta1, then the oil level position estimation unit 41 estimates the oil level height H as being 70 mm.

Next, the oil level position estimation unit 41 estimates the inclination φ of the oil level OL with respect to the casing 2 on the basis of the vehicle tilt angle θ, the longitudinal acceleration Gx, and the turning acceleration Gy. And then the oil level position estimation unit 41 estimates the position P of the oil level OL on the basis of the oil level height H when θ=0° and the inclination φ of the oil level OL.

For example, in the case of the present embodiment, as shown in FIG. 1, the oil level position estimation unit 41 specifies the position P' of the oil level OL upon the straight line Ls according to the tilt angle θ of the vehicle HV. Next, the oil level position estimation unit 41 estimates a position as the position P of the oil level OL by correcting the position P' of the oil level OL in consideration of the longitudinal acceleration Gx and the turning acceleration Gy. In other words, in the case of the present embodiment, the oil position estimation unit 41 does not directly calculate the inclination φ, but rather estimates the position P of the oil level OL by taking the position P' according to the tilt angle θ as a reference, and by calculating the value of the deviation of the oil level OL therefrom according to the longitudinal acceleration Gx and the turning acceleration Gy. Both the position P' and the position P are specified, in this embodiment, as distances from the reference point Sp upon the straight line Ls.

In concrete terms, the oil level position estimation unit 41 refers, for example, to a map M2 such as shown in FIG. 5, and specifies the position P' of the oil level OL on the basis of the oil level height H and the tilt angle θ. At this stage, the longitudinal acceleration Gx and the turning acceleration Gy of the vehicle have not been taken into consideration. The map M2 is generated in advance on the basis of the results of actual machine testing or simulation or the like, and is stored in a predetermined storage device of the ECU 30. In this map M2, a curve I . . . is provided for each oil level height H, and each of these curves I is set so that, as the tilt angle θ becomes larger, the distance from the reference point Sp to the position P' (refer to FIG. 1) becomes shorter. Furthermore, "Pt" in the figure indicates the position of the thermistor 35. The oil level position estimation unit 41 refers to this map M2 and specifies the curve I corresponding to the oil level height H, and then specifies the position P' of the oil level OL corresponding to the tilt angle θ. Next, the oil level position estimation unit 41 estimates a position as the position P of the oil level OL by calculating to what extent the position P' shifts due to the longitudinal acceleration Gx and the turning acceleration Gy of the vehicle HV and correcting the position P'. The oil level position estimation unit 41 outputs this position P after correction to an oil submergence determination unit 42.

As shown in FIG. 1, the oil submergence determination unit 42 compares together the distance Do from the reference point Sp to the position P of the oil level OL and the distance Dt from the reference point Sp to the position Pt of the thermistor 35, and, for example, determines that a fully oil submerged state in which the oil level OL is positioned at or above the thermistor 35 holds if Do≥Dt, while determining that a non oil submerged state in which the oil level OL is positioned below the thermistor 35 holds if Do<Dt. Moreover, the oil submergence determination unit 42 determines the state that holds from the exposure transition time point at which transition from the fully oil submerged state to the non oil submerged state is determined, until a predetermined time interval has elapsed after this transition to exposure of the thermistor 35, as being a partially oil submerged state in which some ATF is still remaining as adhered upon the thermistor. Furthermore, the oil submergence determination unit 42 determines the state after the predetermined time interval has elapsed from the exposure transition time point, i.e. when it may be considered that no ATF remains adhered upon the thermistor 35, as being the non oil submerged state. And the oil submergence determination unit 42 outputs the result R of this determination to an estimation unit 43*a* and to a decision unit 43*b* of the coil temperature estimation unit 43.

In the fully oil submerged state, the detected temperature Ttd detected by the thermistor 35 as being the temperature of the coil 17 and the actual temperature of the coil 17 diverge from one another, and accordingly the reliability of the detected temperature Ttd is poor. Moreover, during a certain time interval after the time point of the transition from the fully oil submerged state to the non oil submerged state, since some of the ATF still is remaining as adhered on the thermistor 35, accordingly the detected temperature Ttd detected by the thermistor 35 and the actual temperature of the coil 17 still diverge from one another to some extent, so that the reliability of the detected temperature Ttd is still rather reduced. On the other hand, when the non oil submerged state is attained after the predetermined time period has elapsed from the time point of transition to the non oil submerged state and it is possible to consider that no ATF remains upon the thermistor 35, then the reliability of the detected temperature Ttd detected by the thermistor 35 recovers. Accordingly, in this embodiment, the case, in which the oil submergence determination unit 42 has determined that the non oil submerged state holds, corresponds to an example of a case in which it is in a state permitting a first temperature estimation, where the correlation of the actual temperature of the coil 17 with the detected temperature Ttd detected by the thermistor 35 is relatively high. Moreover, the case, in which the oil submergence determination unit 42 has determined that the fully oil submerged state or the partially oil submerged state holds, corresponds to an example of a case in which it is in a state not permitting the first temperature estimation.

The coil temperature estimation unit 43 includes the estimation unit 43a and the decision unit 43b. In the fully oil submerged state or in the partially oil submerged state, the estimation unit 43a calculates a value that is obtained by adding an amount of deviation ΔT to the detected temperature Ttd detected by the thermistor 35, as being the estimated temperature Tce of the coil 17. In other words, the estimation unit 43a calculates the estimated temperature Tce of the coil 17 on the basis of Equation #1: Tce=Ttd+ΔT. With this temperature estimation, the correlation with the temperature Ttd detected by the thermistor 35 is lower, as compared with the first temperature estimation in which the detected temperature Ttd detected by the thermistor 35 is estimated as being the temperature of the coil 17 just as it is, or with a predetermined correction value added thereto. Accordingly, this temperature estimation corresponds to a second temperature estimation. The estimation unit 43a outputs the estimated temperature Tce to the decision unit 43b.

As shown in FIG. 6, the actual temperature Tcr of the coil 17 depends upon the torque delivered by the motor-generator 3, in other words upon its Joule heating. And the detected temperature Ttd detected by the thermistor 35 depends upon the amount of heat received from the coil 17 and upon the amount of heat dissipated to the ATF (i.e. the amount of heat received by the ATF). When the thermistor 35 becomes submerged in oil, the amount of deviation ΔT between the actual temperature Tcr of the coil 17 and the detected temperature Ttd detected by the thermistor 35 increases according to elapsed time from this time point, since the amount of heat dissipated from the thermistor 35 to the ATF increases. Due to this, for each combination of the torque of the motor-generator 3 and the oil temperature of the ATF at the transition to submergence, it is possible to investigate the change of the amount of deviation ΔT over time from the transition to submergence as shown in FIG. 6 by, for example, actual machine testing or simulation or the like.

For example, the estimation unit 43a may implement estimation of the amount of deviation ΔT by using a map M3 such as shown in FIG. 7. A number of these maps M3 are prepared, corresponding to various combinations of the torque Tmg of the motor-generator 3 and the oil temperature Ta of the ATF. Each of these maps M3 is generated in advance on the basis of, for example, the results of actual machine testing or simulation or the like, and is stored in a predetermined storage device of the ECU 30. Each of these maps M3 specifies the correspondence between the elapsed time Ton from the time point t1 of a transition to submergence, at which a transition from the non oil submerged state to the fully oil submerged state is determined, and the amount of deviation ΔT, and exhibits a tendency including a section in which the amount of deviation ΔT increases according to the elapsed time Ton. the estimation unit 43a acquires the torque Tmg of the motor-generator 3 at the time point of the transition to submergence, also acquires the oil temperature Ta at the time point of the transition to submergence which is sent from the input unit 40, and then selects the map M3 corresponding to this torque Tmg and this oil temperature Ta that have thus been acquired. And the estimation unit 43a then specifies the amount of deviation ΔT corresponding to the elapsed time Ton from the time point t1 of the transition to submergence by referring to the selected map M3, and calculates an estimated temperature Tce for the coil 17 on the basis of Equation #1 described above.

Moreover, in the case of the partially oil submerged state, the estimation unit 43a estimates the amount of deviation ΔT by a method that is temperature estimation of the same type as the second temperature estimation in which the correlation with the detected temperature Ttd detected by the thermistor 35 is relatively low, however that is different from that used in the case of the fully oil submerged state Then the estimation unit 43a calculates the estimated temperature Tce of the coil 17 on the basis of Equation #1 described above.

As described above, the actual temperature Tcr of the coil 17 depends upon the torque of the motor-generator 3, and the detected temperature Ttd detected by the thermistor 35 depends upon the amount of heat received from the coil 17 and upon the amount of heat dissipated to the ATF (i.e. the amount of heat received by the ATF). When it is transferred from the fully oil submerged state to the non oil submerged state as shown in FIG. 8, the residual amount of ATF adhered to the thermistor 35 at the time of the transition to exposure decreases along with the passage of time. Due to this, since the amount of heat dissipation to the ATF from the thermistor 35 decreases from after the transition to exposure along with the passage of time, accordingly the amount of deviation ΔT between the actual temperature Tcr of the coil 17 and the detected temperature Ttd detected by the thermistor 35 gradually decreases with the elapsed time Toff from the time point t0 of the transition to exposure, at which it has been determined that the transition from the fully oil submerged state to the non oil submerged state has taken place. Accordingly, for each combination of torque of the motor-generator 3 and oil temperature of the ATF at the time point t0 of the transition to exposure, as shown in FIG. 9, it is possible to investigate the change over time of the amount of deviation ΔT after the transition to exposure by, for example, actual machine testing or simulation or the like. Moreover, for each combination of torque of the motor-generator 3 and oil temperature of the ATF, it is possible to specify an ATF remaining time interval Tz corresponding to the time interval after which it is possible to consider this amount of deviation ΔT as being zero. In this embodiment, the period until the elapsed time Toff reaches the ATF remaining time interval Tz is treated as being the partially oil submerged state. Furthermore, the oil submergence determination unit 42 determines that it is the non oil submerged state, after the elapsed time Toff from the time point t0 of the transition to exposure has reached the ATF remaining time interval Tz.

The estimation unit 43a may, for example, implement estimation of the amount of deviation ΔT by using the map M4 shown in FIG. 9. A number of these maps M4 are prepared, corresponding to combinations of the torque Tmg of the motor-generator 3 and the oil temperature Ta of the ATF. Each of these maps M4 is generated in advance on the basis of, for example, actual machine testing or simulation or the like, and is stored in a predetermined storage device of the ECU 30. In each of the maps M4, the elapsed time Toff from the time point To of the transition to exposure at which the transition from the fully oil submerged state to the non oil submerged state is determined and the amount of deviation ΔT are associated with one another, with the amount of deviation ΔT having a tendency to decrease gradually according to the elapsed time Toff. Moreover, an ATF remaining time interval Tz is set for each of the calculation maps M4.

Along with acquiring the torque Tmg of the motor-generator 3 at the transition to exposure, the estimation unit 43a acquires the oil temperature Ta at the time of the transition to exposure that is sent from the input unit 40, and selects the calculation map M4 corresponding to the torque Tmg and the oil temperature Ta that have thus been acquired. And the amount of deviation ΔT corresponding to the elapsed time Toff from the time point t0 of the transition to exposure is specified by referring to the selected calculation map M4, and the estimated temperature Tce of the coil 17 is calculated on the basis of Equation #1 described above. Furthermore, the estimation unit 43a reads out and acquires the stored torque Tmg at the time point of the transition to exposure, since the torque Tmg of the motor-generator 3 is stored repeatedly and sequentially in the ECU 30 in order to provide operational control of the motor-generator 3.

The decision unit 43b refers to the result R of determination by the oil submergence determination unit 42 and, in the case of the fully oil submerged state or the partially oil submerged state, the estimated temperature Tce of the coil 17 calculated by the estimation unit 43a is outputted to the limitation control execution unit 44 as the temperature Tc of the coil 17 to be used in limitation control. On the other hand, the decision unit 43b refers the result R of determination by the oil submergence determination unit 42, and in the case of the non oil submerged state, the decision unit 43b outputs the detected temperature Ttd detected by the thermistor 35 to the limitation control execution unit 44 as the temperature Tc of the coil 17 to be used in the limitation control.

In this manner, according to the result R of determination by the oil submergence determination unit 42, in the case of the non oil submerged state, as the first temperature estimation whose correlation with the detected temperature Ttd detected by the thermistor 35 is relatively high, the coil temperature estimation unit 43 estimates the detected temperature Ttd detected by the thermistor 35 just as it is as being the temperature Tc of the coil 17, and outputs the detected temperature Ttd to the limitation control execution unit 44. On the other hand, in the case of the fully oil submerged state or the partially oil submerged state, as the second temperature estimation whose correlation with the detected temperature Ttd detected by the thermistor 35 is relatively low, the coil temperature estimation unit 43 estimates temperature as the temperature Tc of the coil 17 by adding the estimated amount of deviation ΔT to the detected temperature Ttd detected by the thermistor 35, and outputs the temperature to the limitation control execution unit 44.

The limitation control execution unit 44 compares together the temperature Tc of the coil 17 outputted by the coil temperature estimation unit 43 corresponding to the result R of determination by the oil submergence determination unit 42 and a standard heat resistant temperature Ts for the coil 17 that has been stored in advance, and executes the limitation control to limit the load factor of the motor-generator 3 if the temperature Tc of the coil 17 is higher than this standard heat resistant temperature Ts (i.e. if Tc>Ts). But if the temperature Tc of the coil 17 is less than or equal to the standard heat resistant temperature Ts (i.e. if Tc≤Ts), then no limitation of the load factor of the motor-generator 3 is performed.

The control explained above performed by the ECU 30 may, for example, be implemented by the control routine shown in FIG. 10. This program for the control routine is stored in the ECU 30, and is read out and executed at an appropriate timing.

In step S1, the ECU 30 estimates the oil level height H of the ATF, for example on the basis of the vehicle speed Vs and the oil temperature Ta. Next in step S2 the ECU 30 estimates the inclination φ of the oil level OL of the ATF on the basis of the tilt angle θ of the vehicle HV, its longitudinal acceleration Gx, and its turning acceleration Gy. And then in step S3 the ECU 30 performs oil submergence determination on the basis of the positional relationship between this oil level OL and the thermistor 35, and determines as to which of the fully oil submerged state, the partially oil submerged state, and the non oil submerged state holds.

In step S4, the ECU 30 calculates the estimated temperature Tce of the coil 17 according, for example, to the estimation logic described above for the fully oil submerged state (i.e. according to the second temperature estimation), and sets this estimated temperature Tce as the temperature Tc of the coil 17 to be used for the limitation control. Moreover, in step S5, the ECU 30 calculates the estimated temperature Tce of the coil 17 according, for example, to the estimation logic described above for the partially oil submerged state (i.e. according to the second temperature estimation), and sets this estimated temperature Tce as the temperature Tc of the coil 17 to be used for the limitation control. And in step S6, according to the estimation logic described above, for example, (i.e. according to the first temperature estimation), the ECU 30 sets the detected temperature Ttd detected by the thermistor 35 as the temperature Tc of the coil 17 to be used for the limitation control, In step S7, the ECU 30 compares the temperature Tc for the coil 17 that has been set in one of the steps S4 through S6 with the standard heat resistant temperature Ts of the coil 17, and implements the limitation control of the load factor of the motor generator 3 and transfers the flow of control to step S8 if Tc>Ts, but does not perform the limitation control and transfers the flow of control to step S1 if that is not the case.

By executing the processing of the steps S1 and S2 of the control routine of FIG. 10, the ECU 30 functions as the oil level position estimation unit 41 of FIG. 3. By executing the processing of the step S3, the ECU 30 functions as the oil submergence determination unit 42 of FIG. 3. By executing the processing of the steps S4 through S6, the ECU 30 functions as the coil temperature estimation unit 43 of FIG. 3. By executing the processing of the steps S7 through S8, the ECU 30 functions as the limitation control execution unit 44 of FIG. 3.

As an alternative to the control routine of FIG. 10, the control described above may, for example, be implemented by execution of the control routine shown in more detail in FIGS. 11 through 13. A program for this control routine is stored in the ECU 30, and is read out and executed in a timely manner.

In step S10, the ECU 30 determines as to whether or not the speed Vs of the vehicle HV is less than a reference value Vsc. This reference value Vsc corresponds to a lower limit value of a vehicle speed range in which the thermistor 35 is not submerged in oil, even when the state variables other than the vehicle speed Vs that influence the position of the oil level OL, such as the tilt angle θ of the vehicle HV, its longitudinal angle Gx, its turning acceleration Gy, the oil temperature Ta, and so on change within their hypothesized ranges. Furthermore, this reference value Vsc may also assume different values when the vehicle HV is moving forward and when it is moving backward. In this case, whether the vehicle HV is moving forward or moving backward is determined by the ECU 30 on the basis of the signal of a shift position sensor not shown in the figures that is provided to the vehicle. If the vehicle speed Vs is less than the reference value Vsc, then the flow of control proceeds to step S11, while otherwise the flow of control is transferred to step S19.

In step S11, the ECU 30 estimates the oil level height H of the ATF, for example on the basis of the vehicle speed Vs and the oil temperature Ta as explained above. And in step S12 the ECU 30 estimates the inclination φ of the oil level OL, for example on the basis of the tilt angle θ of the vehicle HV, its longitudinal acceleration Gx, and its turning acceleration Gy. Then in step S13 the ECU 30 implements oil submergence determination in which the ECU 30 estimates the position P of the oil level OL, for example on the basis of the oil level height H and the inclination φ as explained above, and compares together the distance Do from the reference point Sp to the position P of the oil level OL and the distance Dt from the reference point Sp to the position Pt of the thermistor 35. Thereby the ECU 30 determines as to whether or not the distance Do is greater than or equal to the distance Dt so that it is currently in the fully oil submerged state. In the case of the fully oil submerged state the flow of control proceeds to step S14, whereas otherwise the flow of control is transferred to step S20.

In step S14, the ECU 30 counts up to a predetermined value a transition to submergence elapsed time counter C1, which is provided for measuring the elapsed time Ton from the transition to submergence at which the system has transitioned from the non oil submerged state to the fully oil submerged state. And then in step S15 the ECU 30 calculates the estimated temperature Tce of the coil 17, and sets this estimated temperature Tce as the temperature Tc of the coil 17 to be employed for the limitation control. In order to calculate this estimated temperature Tce, the ECU 30 may, for example, select the map M3 (refer to FIG. 7) corresponding to the torque Tmg of the motor-generator 3 and to the oil temperature Ta of the ATF, may convert the value of the transition to submergence elapsed time counter C1 to a time period, and may specify an amount ΔT of deviation corresponding to this time period by searching the map M3 that has thus been selected. Then the ECU 30 calculates the estimated temperature Tce of the coil 17 by adding this amount of deviation ΔT that has been specified to the detected temperature Ttd detected by the thermistor 35.

In step S16, the ECU 30 determines as to whether or not the temperature Tc that has been set in step S15 is higher than the standard heat resistant temperature of the coil 17. If the temperature Tc is higher than the standard heat resistant temperature, then the ECU 30 limits the load factor of the motor-generator 3 in step S17. On the other hand, if the temperature Tc is less than or equal to the standard heat resistant temperature Ts, then in step S18 the ECU 30 does not limit the load factor of the motor-generator 3. In both cases, the flow of control is returned to step S10.

In step S19, the ECU 30 turns off implementation of the oil submergence determination of step S13. Because, when this step is executed, the speed Vs of the vehicle HV is greater than or equal to the reference speed value Vsc, and the thermistor 35 is not submerged in the ATF, no matter how the physical quantities that influence the oil level OL may change. However, if the vehicle speed Vs has changed to be greater than or equal to the reference speed value Vsc while the thermistor 35 was in the submerged state, then the ECU 30 proceeds to step S20 and checks the transition to submergence elapsed time counter C1, since the system must have transitioned from the fully oil submerged state to the non oil submerged state even though the oil submergence determination was not performed.

In step S20, the ECU 30 determines as to whether or not the transition to submergence elapsed time counter C1 is zero. If this elapsed time counter C1 is not zero, since the system is currently in the process of transitioning from the fully oil submerged state to the non oil submerged state, accordingly the flow of control proceeds to step S21 of FIG. 12 in order to perform processing for the partially oil submerged state. On the other hand, if the elapsed time counter C1 is zero, since at least the ATF remaining time interval Tz has elapsed from the transition to exposure (step S22 and step S27), accordingly the flow of control is transferred to step S29 of FIG. 13, in order to perform processing for the non oil submerged state.

In step S21 of FIG. 12, the ECU 30 counts up to a predetermined value an elapsed time after transition to exposure counter C0 that is provided in order to measure the elapsed time Toff from a transition to exposure at the time point t0 at which it transitions from the fully oil submerged state to the non oil submerged state in which the position P of the oil level OL is lower than the position Pt of the thermistor 35. Then in step S22 the ECU 30 converts the ATF remaining time interval Tz to a count value Cz that can be compared with the count value of the elapsed time after transition to exposure counter C0, and determines whether or not the count value of the elapsed time after transition to exposure counter C0 is greater than the count value Cz.

If the count value of the elapsed time after transition to exposure counter C0 is greater than the count value Cz, then, since the partially oil submerged state has terminated and a transition to the non oil submerged state has taken place, accordingly the ECU 30 transfers the flow of control to step S27 in which both the transition to submergence elapsed time counter C1 and the elapsed time after transition to exposure counter C0 are reset. In other words, the ECU 30 sets C1=0 and C0=0. And then the flow of control is transferred to step S28 in order to perform the processing of FIG. 13 for the non oil submerged state. On the other hand, if the count value of the elapsed time after transition to exposure counter C0 is less than or equal to the count value Cz, then, since this implies the partially oil submerged state, accordingly the flow of control proceeds to step S23.

In step S23, the ECU 30 calculates the estimated temperature Tce of the coil 17, and sets this estimated temperature Tce as the temperature Tc of the coil 17 to be used in the limitation control. In order to calculate the estimated temperature Tce in the partially oil submerged state, the ECU 30 may, for example, select the one of the maps M4 (refer to FIG. 9) that corresponds to the torque Tmg of the motor-generator 3 and to the oil temperature Ta of the ATF, may convert the value of the elapsed time after transition to exposure counter C0 to the elapsed time period Toff after the time point t0 of the transition to exposure of the thermistor 35, and may specify an amount of deviation ΔT corresponding to this time period Toff by searching the map M4 that has been selected. And then the ECU 30 calculates the estimated temperature Tce of the coil 17 by adding this specified amount of deviation ΔT to the detected temperature Ttd detected by the thermistor 35.

Then, in step S24, the ECU 30 determines as to whether or not the temperature Tc set in step S23 is higher than the standard heat resistant temperature Ts of the coil 17. If the temperature Tc is higher than the standard heat resistant temperature Ts, then in step S25 limitation of the load factor of the motor-generator 3 is performed. On the other hand, if the temperature Tc is less than or equal to the standard heat resistant temperature Ts, then in step S26 limitation of the load factor of the motor-generator 3 is not performed. In both cases, the flow of control then returns to step S10 of FIG. 11.

In step S28 of FIG. 13, the ECU 30 sets the detected temperature Ttd of the thermistor 35 as the temperature Tc of the coil 17 to be used in the limitation control. Since the detected temperature Ttd is estimated just as it is as being the temperature of the coil 17, accordingly this procedure corresponds to an example of the first temperature estimation in which the correlation with the detected temperature Ttd is relatively high. Furthermore, in this processing, it would also be possible to set the sum of the detected temperature Ttd and a predetermined correction value as the temperature Tc of the coil 17.

In step S29, the ECU 30 determines as to whether or not the temperature Tc set in step S28 is higher than the standard heat resistant temperature Ts of the coil 17. If the temperature Tc is higher than the standard heat resistant temperature Ts, then in step S30 limitation of the load factor of the motor-generator 3 is performed. On the other hand, if the temperature Tc is less than or equal to the standard heat resistant temperature Ts, then in step S31 then limitation of the load factor of the motor-generator 3 is not performed. In both cases, the flow of control then returns to step S10 of FIG. 11.

By executing the processing of the steps S11 and S12 of the control routine of FIGS. 10 through 13, the ECU 30 functions as the oil level position estimation unit 41 of FIG. 3. By executing the processing of the step S13, the ECU 30 functions as the oil submergence determination unit 42 of FIG. 3. By executing the processing of the steps S14 and S15, the processing of steps S21 through S23, and the processing of step S28, the ECU 30 functions as the coil temperature estimation unit 43 of FIG. 3. By executing the processing of the steps S16 through S18, the processing of the steps S24 through S26, and the processing of the steps S29 through S31, the ECU 30 functions as the limitation control execution unit 44 of FIG. 3.

In the control routine shown in FIGS. 10 through 13, according to the result of the oil submergence determination in step S13, it is determined whether or not the state of the apparatus is such as to permit the first temperature estimation in which the correlation with the detected temperature Ttd detected by the thermistor 35 is relatively high, and if the apparatus state permits it, then the limitation control is performed on the basis of the result of estimation by this first temperature estimation. However, if it is not permitted, then the limitation control is performed on the basis of the result of estimation by the second temperature estimation (steps S14 and S15 of FIG. 11, and steps S21 through S23 of FIG. 12) in which the correlation with the detected temperature Ttd detected by the thermistor 35 is relatively low. Moreover, in step S10 it is determined whether or not the apparatus state is such as to permit the first temperature estimation, without performing the oil submergence determination in step S13.

Effects of this Embodiment

FIG. 14 shows an example of the effects of this embodiment. In the comparison example of FIG. 14, irrespective of the positional relationship between the oil level OL and the thermistor 35, the limitation control is performed by taking a value obtained by adding a fixed correction amount ΔT' to the detected temperature Ttd detected by the thermistor 35 as the temperature Tc' of the coil 17. In this comparison example, during the fully oil submerged state, the temperature Tc' that is employed in the limitation control deviates toward the high temperature side from the actual temperature Tcr. By contrast, with the present embodiment, in the case of the fully oil submerged state, during the limitation control, the estimated temperature Tce is employed as the temperature of the coil 17, and this estimated temperature Tce and the actual temperature Tcr of the coil 17 are in comparatively good mutual agreement. Accordingly, in the case of this embodiment, the time point TB at which the temperature Tc of the coil 17 reaches the standard heat resistant temperature Ts and limitation of the load factor of the motor-generator 3 is started becomes later than the corresponding time point TA in the case of the comparison example. Due to this, it is possible to avoid a situation in which the load factor of the motor-generator 3 becomes excessively limited. And, due to this, it is possible to implement the limitation control of the load factor of the motor-generator 3 in an appropriate manner.

In the present embodiment, the partially oil submerged state is set, and the limitation control is performed by using the estimated temperature Tce as the temperature Tc of the coil 17, until the ATF remaining time interval Tz has elapsed from the time point t0 of transition to exposure on which it is transitioned from the fully oil submerged state in which the oil level OL is positioned above the thermistor 35 to the non oil submerged state in which the oil level is positioned below the thermistor. After this ATF remaining time interval Tz has elapsed, the non oil submerged state is set, and the limitation control is performed by using the detected temperature Ttd detected by the thermistor 35 as the temperature Tc of the coil 17. By doing this, it is possible to estimate the temperature of the coil 17 more accurately, as compared to the aspect in which the detected temperature Ttd is employed as the temperature Tc of the coil 17 directly after transition from the fully oil submerged state to the non oil submerged state, since the temperature of the coil 17 is estimated while taking the time period that residual ATF remains upon the thermistor 35 into consideration.

In the present embodiment, the position P of the oil level OL is estimated, on the basis of the oil level height H which is representative of the retained amount of ATF retained in the bottom of the casing 2, the tilt angle θ of the vehicle HV, and accelerations such as the longitudinal acceleration Gx and the turning acceleration Gy and so on, to determine the positional relationship of the oil level OL and the thermistor 35. Accordingly, the accuracy of estimation of the position P of the oil level OL is enhanced, as compared, for example, to the case in which the position of the oil level OL is estimated without any consideration being given to the accelerations and so on.

In the present embodiment the oil level H representing the retained amount of ATF, which forms the oil level OL and is retained in the bottom of the casing 2, is calculated on the basis of the vehicle speed Vs, which is correlated with the rotational speed of the ring gear 20, and on the basis of the oil temperature Ta of the ATF. Due to this, it is possible to calculate the oil level height H without providing any level sensor or the like for detecting the oil level height H in the casing 2.

Variant Embodiments

The vehicle HV of the embodiment described above has been described as being a hybrid vehicle, but this could also be changed to be an electric automobile that, as a source of drive power, is equipped with a rotating electrical machine such as a motor-generator or the like, and that is not equipped with any internal combustion engine. Furthermore, the rotating electrical machine may be a motor-generator that functions either as an electric motor or as a generator, or may be an electric motor that does not function as a generator.

Although, in the embodiment described above, the temperature of the coil 17 was detected with the thermistor 35, this could also be changed, for example, to be a thermocouple, instead of the thermistor 35.

The embodiment described above was the aspect in which the ATF was dragged up by the ring gear 20 which was driven by the power of the vehicle HV, but this could also be changed, for example, to an aspect in which, instead of the ring gear 20, an idler gear that is driven by the power of the vehicle HV is provided within the casing 2, and the ATF is dragged up by this idler gear.

In the embodiment described above, the positional relationship of the thermistor 35 and the oil level OL was specified by estimating the position of the oil level OL, but it would be possible to change this aspect by providing a detection device such as a level sensor or the like that detects the position of the oil level OL, and by directly detecting the position of the oil level OL.

Moreover it would also be possible to make an alteration to determining whether or not the situation permits treating the detected temperature Ttd detected by the thermistor 35 as the temperature of the coil 17 on the basis of the running state of the vehicle HV, without actually estimating or detecting the position of the oil level OL. Since running conditions of the vehicle change in various ways, accordingly, if whether the oil level OL is positioned above or below the thermistor 35 is taken as being an absolute standard of reference, sometimes it may happen that this may not accord with the actual conditions of the vehicle. For example, in step S10 of FIG. 11, the operation is divided between use of the first temperature estimation and use of the second temperature estimation with taking only the speed Vs of the vehicle HV as reference, and without performing the oil submergence determination. Accordingly, it would be possible to change the present embodiment to an aspect in which, without performing the oil submergence determination but taking only a state variable of the vehicle HV for reference as in step S10 of FIG. 11, it is determined whether or not the operational state of the vehicle permits the first temperature estimation (step S28 of FIG. 13), and, if the state does so permit, the estimation result of the first temperature estimation is employed, while, if the operational state does not so permit, the estimation result of the second temperature estimation (steps S14 and S15 of FIG. 11, and steps S21 through S23 of FIG. 12) is employed.

For example, the present embodiment may be changed to an aspect in which it is determined that the above described permitted operational state does not hold if the condition that travelling with the tilt angle θ of the vehicle HV being greater than or equal to a threshold value has continued for a predetermined time period or longer holds, and in this case the temperature of the coil 17 is estimated by the second temperature estimation, whereas, if this condition does not hold, then it is determined that the above described permitted operational state does hold, and in this case the first temperature estimation in which the detected temperature Ttd detected by the thermistor 35 is estimated as being the temperature of the coil 17 is employed. Furthermore, the present embodiment would also be possible to be changed to an aspect in which, a standard for determining whether or not the above described permitted operational state is whether or not it can be presumed that the thermistor 35 is in the state of being fully submerged in the ATF or not without referring to whether the oil level OL is positioned above or below the thermistor 35. This can be presumed: when traveling in which the speed Vs of the vehicle HV has been greater than or equal to a threshold value has continued for a predetermined time period or greater; when traveling in which the longitudinal acceleration Gx of the vehicle HV has been greater than or equal to a threshold value has continued for a predetermined time period or greater; when traveling in which the turning acceleration Gy of the vehicle HV has been greater than or equal to a threshold value has continued for a predetermined time period or greater; or the like.

In the embodiment described above, in the second temperature estimation, the temperature of the coil 17 was estimated by employing the detected temperature Ttd as shown by Equation #1 described above. However, the embodiment would also be possible to be changed to, for example, an aspect in which, as the second temperature estimation, the ECU 30 performs estimation of the temperature of the coil 17 on the basis of the torque Tmg of the motor-generator 3 and the oil temperature Ta of the ATF, without employing the detected temperature Ttd.

In the embodiment described above, the state until the ATF remaining time period elapsed after a transition to exposure, on which it is transitioned from the fully oil submerged state to a state in which the oil level OL was positioned below the thermistor 35, was considered as being the partially oil submerged state and the temperature of the coil 17 was estimated during this state. However, the embodiment would also be possible to be changed to, for example, an aspect in which, without providing a transient state of this type, the detected temperature Tce is employed as the temperature of the coil 17 after the transition to exposure in the limitation control.

The partially oil submerged state of the embodiment described above may, for example, be modified to an aspect in which the period after the transition to exposure is divided into several stages according to elapsed time and methods of temperature estimation at respective stages to be mutually different.

In order to make the control more stable, the embodiment would also be acceptable to change to an aspect in which, in order to determine upon the fully oil submerged state, the position Pt of the thermistor 35 upon the straight line Ls is defined between an upper end position Ptu and a lower end position Ptd of the thermistor 35, with a distance from the reference point Sp to the upper end position Ptu being a distance Dtu and a distance from the reference point Sp to the lower end position Ptd being a distance Dtd, and it is determined that the fully oil submerged state holds when the distance Do≥Dtu, and it is determined that the non oil submerged state holds when Do<Dtd, and the range Dtd≤Do<Dtu is deemed to be a dead zone.

Aspects of the present disclosure derived from each of the embodiments and variant embodiments described above will now be described.

A power transmission device according to one aspect of the present disclosure includes: a casing within which lubricating oil is received; a rotating electrical machine provided within the casing, and including a stator with a coil; a rotating member capable of being driven by power of a vehicle, and provided within the casing so as to drag the lubricating oil up toward the coil; a temperature sensor provided within the casing; and a control device that functions as: a coil temperature estimation device capable of executing a first temperature estimation in which correlation with a detected temperature detected by the temperature sensor is relatively high, and a second temperature estimation in which the correlation is relatively low; a determination device determining whether or not positional relationship between the temperature sensor and oil level of the lubricating oil is in a permitted state that permits the first temperature estimation; and a limitation device that limits a load factor of the rotating electrical machine based on a result of the first temperature estimation when determined that the positional relationship is in the permitted state, and that limits the load factor of the rotating electrical machine based on a result of the second temperature estimation when determined that the positional relationship is not in the permitted state.

For example, in the embodiments and variant embodiments described above: the ATF is equivalent to an example of the lubricating oil; the motor-generator 3 is equivalent to an example of the rotating electrical machine; the ring gear 2 or the idler gear is equivalent to an example of the rotating member; the thermistor 35 or the thermocouple is equivalent to an example of the temperature sensor; the ECU 30 is equivalent to an example of the control device; the coil temperature estimation unit 43 is equivalent to an example of the coil temperature estimation device; and the torque of the motor-generator 3 or the oil temperature Ta of the ATF is equivalent to an example of a state variable.

In relation to the determination device, for example, the combination of the oil level position estimation unit 41 and the oil submergence determination unit 42 of the embodiment described above is equivalent to an example of the determination device. Moreover, with the control routine of FIGS. 11 through 13 of the embodiment described above, the ECU 30 functions as one example of the determination device by executing the steps S10 through S13. Furthermore, in the variant embodiment described above, the ECU 30 functions as an example of the determination device by executing processing to determine whether or not it is in the permitted state in which the first temperature estimation (step S28 of FIG. 13) is permitted by taking only a state variable of the vehicle HV as reference, as in the step S10 of FIG. 11, without performing the oil submergence determination, and employing the result of the first temperature estimation if it is in the permitted state, while otherwise employing the result of the second temperature estimation (steps S14 and S15 of FIG. 11 and steps S21 through S23 of FIG. 12).

When the oil submergence determination unit 42 has determined upon the non oil submerged state, this is equivalent to an example of "it is in the permitted state in which the first temperature estimation is permitted". Moreover, when the oil submergence determination unit 42 has determined upon the fully oil submerged state or upon the partially oil submerged state, this is equivalent to an example of "it is not in the permitted state in which the first temperature estimation is permitted". An example of "it is not in the permitted state in which the first temperature estimation is permitted" is equivalent to each of: when the condition holds that traveling with the tilt angle θ of the vehicle HV being greater than or equal to a threshold value has continued for a predetermined time period or longer; when the condition holds that traveling with the speed Vs of the vehicle HV being less than or equal to a threshold value has continued for a predetermined time period or longer; when the condition holds that traveling with the longitudinal acceleration Gx of the vehicle HV being greater than or equal to a threshold value has continued for a predetermined time period or longer; and when the condition holds that traveling with the turning acceleration Gy of the vehicle HV being greater than or equal to a threshold value has continued for a predetermined time period or longer.

According to the aspect described above, when the positional relationship between the temperature sensor and the oil level of the lubricating oil is in a permitted state that permits the first temperature estimation in which the correlation with the detected temperature detected by the temperature sensor is relatively high, the load factor of the rotating electrical machine is limited on the basis of the result of this first temperature estimation. If the positional relationship is not in the permitted state, the load factor of the rotating electrical machine is limited on the basis of the result of the second temperature estimation in which the correlation with the detected temperature detected by the temperature sensor is relatively low. Accordingly, when the reliability of the detected temperature detected by the temperature sensor is reduced due to the positional relationship between the temperature sensor and the oil level of the lubricating oil, limitation of the load factor of the rotating electrical machine on the basis of the first temperature estimation in which the correlation with the detected temperature is relatively high is avoided. Due to this, it is possible to implement limitation control of the load factor of the rotating electrical machine in an appropriate manner.

In the aspect described above, it will be acceptable for the determination device to include an oil level position estimation device that estimates a position of the oil level based on a state variables of the vehicle that influence the position of the oil level, and to arrange for the determination device to determine whether or not the positional relationship is in the permitted state based on the position of the oil level as estimated by the oil level position estimation device. In this case it is possible to reduce the number of components, since it is possible to determine the positional relationship between the oil level and the temperature sensor without detecting the position of the oil level of the lubricating oil with any position detection device such as a level sensor or the like. Furthermore, in this case, the oil level position estimation device may estimate the position of the oil level based on, as state variables that influence the position of the oil level, a retained amount of the lubricating oil retained in the casing and an inclination of the oil level with respect to the casing. The oil level position estimation device may calculate the retained amount of the lubricating oil based on rotational speed of the rotating member and temperature of the lubricating oil. Moreover, the oil level position estimation device may estimate the inclination of the oil level based on a tilt angle with respect to a horizontal direction of the vehicle and the accelerations of the vehicle.

In the aspect described above, as the second temperature estimation, the coil temperature estimation device may perform: referring, as state variables of the vehicle that influence temperature of the coil, to elapsed time from transition time point at which a state is transitioned from a state in which the determination device has determined that the permitted state holds to a state in which the determination device has determined that the permitted state does not hold, and to torque of the rotating electrical machine and temperature of the lubricating oil at the transition time point; estimating an amount of deviation between the detected temperature and actual temperature of the coil, which amount increases according to the elapsed time; and adding the amount of deviation to the detected temperature, and the coil temperature estimation device thereby estimates the temperature of the coil. For example, in the embodiments and variant embodiments described above, the time point t1 of the transition to submergence corresponds to an example of "transition time point at which a state is transitioned from a state in which the determination device has determined that the permitted state holds to a state in which the determination device has determined that the permitted state does not hold", and the elapsed time Ton from the time point t1 of the transition to submergence corresponds to an example of the elapsed time. In this case the accuracy of estimation of the temperature of the coil is enhanced, since the temperature of the coil is estimated according to the tendency of the change over time after the transition to submergence of the amount of deviation between the actual temperature of the coil and the detected temperature detected by the temperature sensor.

In the aspect described above, it would also be acceptable to arrange for the determination device to determine whether or not the permitted state holds, based on whether the oil level is positioned above the temperature sensor or below the temperature sensor, as the positional relationship. In this case it is possible reliably to determine whether or not it is in a state in which it is permitted to employ the detected temperature detected by the temperature sensor as the temperature of the coil, since whether or not the temperature sensor is actually submerged in oil is taken as a reference. In this case, the determination device may determine that a state, in which the oil level is positioned below the temperature sensor, is the permitted state. Furthermore, the determination device may determine that a state, in which the oil level is positioned above the temperature sensor, is not the permitted state.

It would also be acceptable to arrange for the determination device to determine that a state from transition to exposure, at which it transitions from a state in which the oil level is positioned above the temperature sensor to a state in which the oil level is positioned below the temperature sensor, until a predetermined time period has elapsed is not the permitted state, and to determine that a state after the predetermined time period has elapsed is the permitted state. For example, in the embodiments and variant embodiments described above, the ATF remaining time interval Tz is equivalent to an example of this predetermined time period. According to this, it is possible to estimate the temperature of the coil in a more accurate manner, as compared with an aspect in which, after the transition to exposure, the detected temperature is treated as being the temperature of the coil, since the temperature of the coil is estimated by taking into consideration the residual time period during which some lubricating oil remains upon the temperature sensor.

Furthermore, as the second temperature estimation, the coil temperature estimation device may perform: referring, as state variables of the vehicle that influence temperature of the coil, to elapsed time after the transition to exposure and to torque of the rotating electrical machine and temperature of the lubricating oil after the transition to exposure; estimating an amount of deviation between the detected temperature and actual temperature of the coil, which amount decreases according to the elapsed time; and adding the amount of deviation to the detected temperature, and the coil temperature estimation device thereby estimates the temperature of the coil. According to this, the accuracy of estimation of the temperature of the coil is enhanced, since the temperature of the coil is estimated while paying attention to the tendency of the amount of deviation between the actual temperature of the coil and the detected temperature detected by the temperature sensor to change over time after a transition to exposure.

This application claims the benefit of Japanese Patent Application No. 2017-219968, filed Nov. 15, 2017, which is hereby incorporated by reference herein in its entirety.

What is claimed is:

1. A vehicle drive device comprising:
a casing within which lubricating oil is received;
a rotating electrical machine provided within the casing, and including a stator with a coil;
a rotating member capable of being driven by power of a vehicle, and provided within the casing so as to drag the lubricating oil up toward the coil;
a temperature sensor provided within the casing; and
a control device that functions as:
a coil temperature estimation device capable of executing a first temperature estimation in which correlation with a detected temperature detected by the temperature sensor is relatively high, and a second temperature estimation in which the correlation is relatively low;
a determination device determining whether or not positional relationship between the temperature sensor and oil level of the lubricating oil is in a permitted state that permits the first temperature estimation; and
a limitation device that limits a load factor of the rotating electrical machine based on a result of the first temperature estimation when determined that the positional relationship is in the permitted state, and that limits the load factor of the rotating electrical machine based on a result of the second temperature estimation when determined that the positional relationship is not in the permitted state.

2. A vehicle drive device according to claim 1, wherein the determination device includes an oil level position estimation device that estimates a position of the oil level on based on a state variable of the vehicle that influence the position of the oil level, and
the determination device determines whether or not the positional relationship is in the permitted state based on the position of the oil level estimated by the oil level position estimation device.

3. A vehicle drive device according to claim 2, wherein the oil level position estimation device estimates the position of the oil level based on, as state variables that influence the position of the oil level, a retained amount of the lubricating oil retained in the casing and an inclination of the oil level with respect to the casing.

4. A vehicle drive device according to claim 3, wherein the oil level position calculates the retained amount of the lubricating oil based on rotational speed of the rotating member and temperature of the lubricating oil.

5. A vehicle drive device according to claim 3, wherein the oil level position estimation device estimates the inclination of the oil level based on a tilt angle with respect to a horizontal direction of the vehicle and acceleration of the vehicle.

6. A vehicle drive device according to claim 1, wherein, as the second temperature estimation, the coil temperature estimation device performs:
- referring, as state variables of the vehicle that influence temperature of the coil, to elapsed time from transition time point at which a state is transitioned from a state in which the determination device has determined that the permitted state holds to a state in which the determination device has determined that the permitted state does not hold, and to torque of the rotating electrical machine and temperature of the lubricating oil at the transition time point;
- estimating an amount of deviation between the detected temperature and actual temperature of the coil, which amount increases according to the elapsed time; and
- adding the amount of deviation to the detected temperature, and
- the coil temperature estimation device thereby estimates the temperature of the coil.

7. A vehicle drive device according to claim 1, wherein the determination device determines whether or not the permitted state holds, based on whether the oil level is positioned above the temperature sensor or below the temperature sensor, as the positional relationship.

8. A vehicle drive device according to claim 7, wherein the determination device determines that a state, in which the oil level is positioned below the temperature sensor, is the permitted state.

9. A vehicle drive device according to claim 7, wherein the determination device determines that a state, in which the oil level is positioned above the temperature sensor, is not the permitted state.

10. A vehicle drive device according to claim 7, wherein the determination device determines that a state from transition to exposure, at which it transitions from a state in which the oil level is positioned above the temperature sensor to a state in which the oil level is positioned below the temperature sensor, until a predetermined time period has elapsed is not the permitted state, and determines that a state after the predetermined time period has elapsed is the permitted state.

11. A vehicle drive device according to claim 10, wherein, as the second temperature estimation, the coil temperature estimation device performs:
- referring, as state variables of the vehicle that influence temperature of the coil, to elapsed time after the transition to exposure and to torque of the rotating electrical machine and temperature of the lubricating oil after the transition to exposure;
- estimating an amount of deviation between the detected temperature and actual temperature of the coil, which amount decreases according to the elapsed time; and
- adding the amount of deviation to the detected temperature, and
- the coil temperature estimation device thereby estimates the temperature of the coil.

* * * * *